United States Patent [19]

Shiotani et al.

[11] Patent Number: 5,895,311
[45] Date of Patent: Apr. 20, 1999

[54] ABRASIVE DEVICE THAT MAINTAINS NORMAL LINE OF CONTACT WITH CURVED ABRASIVE SURFACE AND METHOD OF USING SAME

[75] Inventors: Takekazu Shiotani; Kimihiro Wakabayashi, both of Nakai-machi; Kazutoshi Hamada; Takaaki Sakakibara, both of Ebina; Toshimasa Fujisawa, Nakai-machi, all of Japan

[73] Assignee: Fuji Xerox Co., Ltd., Tokyo, Japan

[21] Appl. No.: 08/869,217

[22] Filed: Jun. 4, 1997

[30] Foreign Application Priority Data

Jun. 6, 1996 [JP] Japan .................................. 8-143922
Jun. 19, 1996 [JP] Japan .................................. 8-157826

[51] Int. Cl.$^6$ ................ B24B 49/00; B24B 1/00; B24B 7/02
[52] U.S. Cl. .................. 451/5; 451/11; 451/57; 451/42; 451/127; 451/137; 451/138; 451/150; 451/164; 451/166; 451/215; 451/216; 451/226; 451/393; 451/495; 451/505; 451/504; 451/913
[58] Field of Search .................. 451/41, 42, 124, 451/127, 136, 137, 138, 150, 162, 164, 166, 174, 212, 213, 215, 216, 218, 226, 236, 387, 393, 405, 495, 504, 505, 913, 5, 10, 11, 57

[56] References Cited

U.S. PATENT DOCUMENTS

| 3,050,909 | 8/1962 | Rawstron | 451/42 |
| 4,735,019 | 4/1988 | Wiederkehr | 451/215 X |
| 4,936,052 | 6/1990 | Nagase et al. | 451/152 |
| 4,987,700 | 1/1991 | Westerman et al. | 451/152 |
| 5,255,474 | 10/1993 | Gawa et al. | 451/295 |
| 5,681,209 | 10/1997 | Naumann et al. | 451/51 |

FOREIGN PATENT DOCUMENTS

A-5-57606 3/1993 Japan.

*Primary Examiner*—Timothy V. Eley
*Attorney, Agent, or Firm*—Oliff & Berridge, PLC

[57] ABSTRACT

An abrasive apparatus adopted to abrade a curved surface of workpiece includes: an abrading head including an abrading tip having a substantially spherical outer surface and a rotating shaft supporting the abrading tip, the abrading head being positioned to face the curved surface; a thrust moving mechanism for relatively moving the abrading head and the curved surface; a lateral moving mechanism for relatively moving the abrading head and the curved surface; a pivotal moving mechanism for relatively moving the abrading head and the curved surface pivotally around a center point; and a controller for controlling the abrading head, the thrust moving mechanism, the lateral moving mechanism and the pivotal moving mechanism synchronously so that the abrading tip contacts and presses the curved surface at any point thereon with a substantially constant pressure in a direction consistent with a normal line thereat. An angle adjuster supporting the abrading head for adjusting an angle of the rotating shaft against the curved surface is also disclosed.

20 Claims, 16 Drawing Sheets

ABRASIVE DEVICE THAT MAINTAINS NORMAL LINE OF CONTACT WITH CURVED ABRASIVE SURFACE AND METHOD OF USING SAME

BACKGROUND OF THE INVENTION

This invention relates to an abrasive device and an abrasive method for abrading a curved or an aspheric surface, which has no axis of rotative symmetry, of optical elements such as aspheric optical lenses or mirrors or of die assembly such as an injection molding die for producing the optical elements. More specifically, this invention relates to a cost-effective abrasive device and abrasive method having high processing precision.

Japanese unexamined patent publication 5-57606 (referred to as JP-A) discloses a prior abrasive device for abrading curved surface or aspheric surface, which has no axis of rotative symmetry, of optical elements such as aspheric optical lenses or mirrors or of die assembly such as injection molding die for producing the optical elements.

FIG. 14 shows the prior abrasive device. The abrasive device comprises a level block 2, a horizontal movement stage 1A for moving the workpiece 3 in a horizontal direction, a configuration measuring element 1B for measuring the surface configuration of a work surface 3A of the workpiece 3 being transported by the horizontal movement stage 1A and an abrading processor 1C for abrading the work surface 3A of the workpiece 3 being transported by the horizontal movement stage 1A according to a surface configuration data acquired through the configuration measuring element 1B.

The horizontal movement stage 1A comprises a Y-axis table 4 slidably mounted on the level block 2, a ball screw 5 being gear-engaged with an internal nut (not shown) of the Y-axis table, a motor 6 for moving the Y-axis table along to the Y-axis direction by rotating the ball screw 5, X-axis table 7 mounted slidably on the Y-axis table 4, a ball screw 8 being gear-engaged with an internal nut (not shown) of the X-axis table, a motor 9 for moving the X-axis table 7 along to the X-axis direction by rotating the ball screw 8 and a θ table 10 rotatably mounted by an internal motor (not shown).

The abrading processor 1C comprises L-shaped abrading frames 11A, 11B and 11C mounted on the level block 2, Z-direction tilting device 13 mounted on one end of each abrading frame 11A, 11B and 11C through a mounting plate 12 and an abrading head 14 mounted on the Z-direction tilting device.

FIG. 15 shows a configuration of the Z-direction tilting device 13. The Z-direction tilting device 13 comprises a triangular mounting plate 15 having three apexes 15a, each of which is fixed on the mounting plate 12, shafts 16A, 16B and 16C (not shown) each of which is mounted on one surface of the triangular mounting plate in parallel to one of three facets of the triangular mounting plate respectively, blocks 17A, 17B and 17C each of which is mounted rotatably around one of shafts 16A, 16B and 16C respectively, abrading arms 18A, 18B and 18C each of which defines an opening for incorporating one of those blocks 17A, 17B and 17C so that each block is slidably engaged perpendicularly to inner facets of each abrading arm, ball screws 19A, 19B and 19C being gear-engaged with each inner nut (not shown) of each block 17A, 17B and 17C and mounted in each opening of on abrading arm 18A, 18B and 18C, motors 20A, 20B and 20C for moving each abrading arm 18A, 18B and 18C in vertical direction by rotating each ball screw 19A, 19B and 19C and triangular mounting plate 22 for mounting an abrading head thereon, which is mounted on abrading arms 18A, 18B and 18C through universal joints 21A, 21B and 21C.

FIG. 16 shows a configuration of the abrading head 14. The abrading head 14 comprises a cylindrical abrading tip 23 for abrading the work surface 3A of the workpiece 3, an abrading tip holder 24 for holding the abrading tip 23, a pressure applying device 26 for applying a constant pressing force to the abrading tip 23 through a loading shaft 25 and a rocking device 27 for rocking, i.e., reciprocating, the abrading tip 23 in an arrow direction D.

The constant pressure applying device 26 comprises a voice coil motor (not shown), plate spring (not shown) and loading sensor (not shown) each of which are attached to the loading shaft 25 for always maintaining an adjusted pressing force. The loading shaft 25 also comprises a displacement sensor (not shown) for detecting an updated amount of displacement of the loading shaft 25 in the direction of its axis.

The rocking device 27 comprises a crank 29 mechanically engaged to a rotating shaft 28A of the motor 28, a connecting rod 30 for transforming the rotating movement of the crank 29 into a reciprocal movement and a slider 32 that is fixed on a casing of the constant pressure applying device 26 and slidably mounted on a slide shaft 31 imposed by the reciprocal movement.

In a practical abrading process utilizing this device, primarily, abrasive is applied onto the work surface 3A of the workpiece 3, and the abrading tip 23 is placed onto the work surface 3A by moving the abrading head 23 downward by actuating the Z-direction tilting device 14. Then, the abrading tip 23 is reciprocally moved in the arrow direction D by actuating the rocking device 27 while a certain pressing force is applied onto the abrading tip 23 by the constant pressure applying device 26 in order to abrade the work surface 3A of the workpiece 3 with the abrading tip 23. At this time, the abrading head 14 scans and abrades the working surface 3A synchronously controlled by respective movements of Y-axis table 4, X-axis table 7, θ table 10 and Z-direction tilting device 14 based on a scanning pattern and a scanning speed distribution, discussed below, in accordance with the detected surface configuration of the work surface 3A so that the pressing direction of the abrading tip 23 is always consistent with the direction of a normal line on the work surface 3A and so that the amount of the displacement of the loading shaft 25 acquired by the displacement sensor is always constant. Since the abraded amount is in proportion to each of the pressing force, relative moving speed with the workpiece and dwell time of the abrading tip 23, a dwell time distribution of the abrading tip 23, i.e., scanning speed distribution of the abrading tip 23, required to produce an approximate objective configuration on the work surface 3A is estimated from both a hypothetical unit amount to be abraded of the work surface 3A by the abrading tip 23 per unit time when the pressing force on the abrading tip 23 and the relative moving speed with the work surface 3A is maintained constant and a difference between practically measured configuration of the work surface 3A measured by the configuration measuring element 1B and the objective surface configuration thereof.

The aforementioned prior abrasive device has the following disadvantages:

(1) Since the abrading tip has cylindrical shape and the contact area with the work surface is relatively large, a pressing force distribution of the abrading tip is easily changed even while the pressing force thereof is maintained constant when a curvature of the work surface where the abrading tip contacts is changed in accordance with the scanning movement of the abrading head. Furthermore, the relative speed distribution or pressing force distribution of the abrading tip is easily changed while the contacting location of the abrading tip on the work surface moves because the direction of the normal line on the work surface is varied according to the scanning of the abrading tip in an area where the radius of curvature of the work surface is relatively small. Thus, the unit amount of the work surface to be abraded by the abrading tip per unit time, i.e., equal to the product of the pressing force, the relative moving speed and the dwell time of the abrading tip, is easily changed according to the variety of surface configuration of the work surface to reduce the processing precision.

(2) Since the relative scan of the abrading head is performed and controlled by six controlling axes, i.e., six controlling shafts, the design of the abrasive device tend to be complicated to increase manufacturing costs.

(3) Since the abrading head is scanned in response to the detected configuration of the work surface, huge amounts of controlling data are required to control the abrading head even in a relatively short scanning distance, thus, calculating time of a controller increases to reduce the scanning speed of the abrading head. Therefore, the processing precision decreases since the total amount of work surface to be abraded is difficult to be controlled by the mere control of the scanning speed of the abrading head.

(4) Since the scanning of the abrading head is controlled by a synchronous control of respective driving shafts for abrading the entire work surface, the controlling data tend to be huge and thus, the manufacturing cost of the abrading device tends to increase according to increases in memory capacity of the controller.

In addition, in this prior abrasive device, since the position of the abrading head is varied based on a standard position different from the contacting point between the work surface and the abrading tip, the horizontal position and vertical position of the abrading tip are also changed according to the position change of the abrading head, therefore, horizontal position or vertical position of the abrading head or workpiece itself has to also be compensated accordingly. Furthermore, since such compensation on the positioning data will be a high load when the variation of normal lines on the work surface is huge, the scanning speed of the abrading tip can not compete with the commanded scanning speed because of the mechanical limitation on scanning speed or the calculation speed of the processor. Thus, the dwell time distribution of the abrading head is far from the commanded dwell time distribution which decreases the processing precision.

SUMMARY OF THE INVENTION

One object of the invention is to provide a cost-effective abrasive device and an abrasive method having high processing precision.

Another object of the invention is to provide an abrasive device and an abrasive method capable of scanning the abrading tip by a commanded scanning speed to increase the processing precision.

Still another object of the present invention is to provide an abrasive device adopted to abrade a curved surface of a workpiece comprising: an abrading head including an abrading tip having a substantially spherical outer surface and a rotating shaft supporting the abrading tip, the abrading head being positioned to face the curved surface; a thrust moving mechanism for relatively moving the abrading head and the curved surface; a lateral moving mechanism for relatively moving the abrading head and the curved surface; a pivotal moving mechanism for relatively moving the abrading head and the curved surface pivotally around a center point; and a controller for controlling the abrading head, the thrust moving mechanism, the lateral moving mechanism and the pivotal moving mechanism synchronously so that the abrading tip contacts and presses the curved surface at any point thereon with a substantially constant pressure in a direction consistent with a normal line thereat.

Yet another object of the present invention is to provide the abrasive device further comprising an angle adjuster supporting the abrading head for adjusting an angle of the rotating shaft against the curved surface.

DETAILED DESCRIPTION OF PREFERRED EMBODIMENTS

The abrasive device and the abrasive method of present invention are explained hereinafter by referring to attached drawings.

Figure 1:
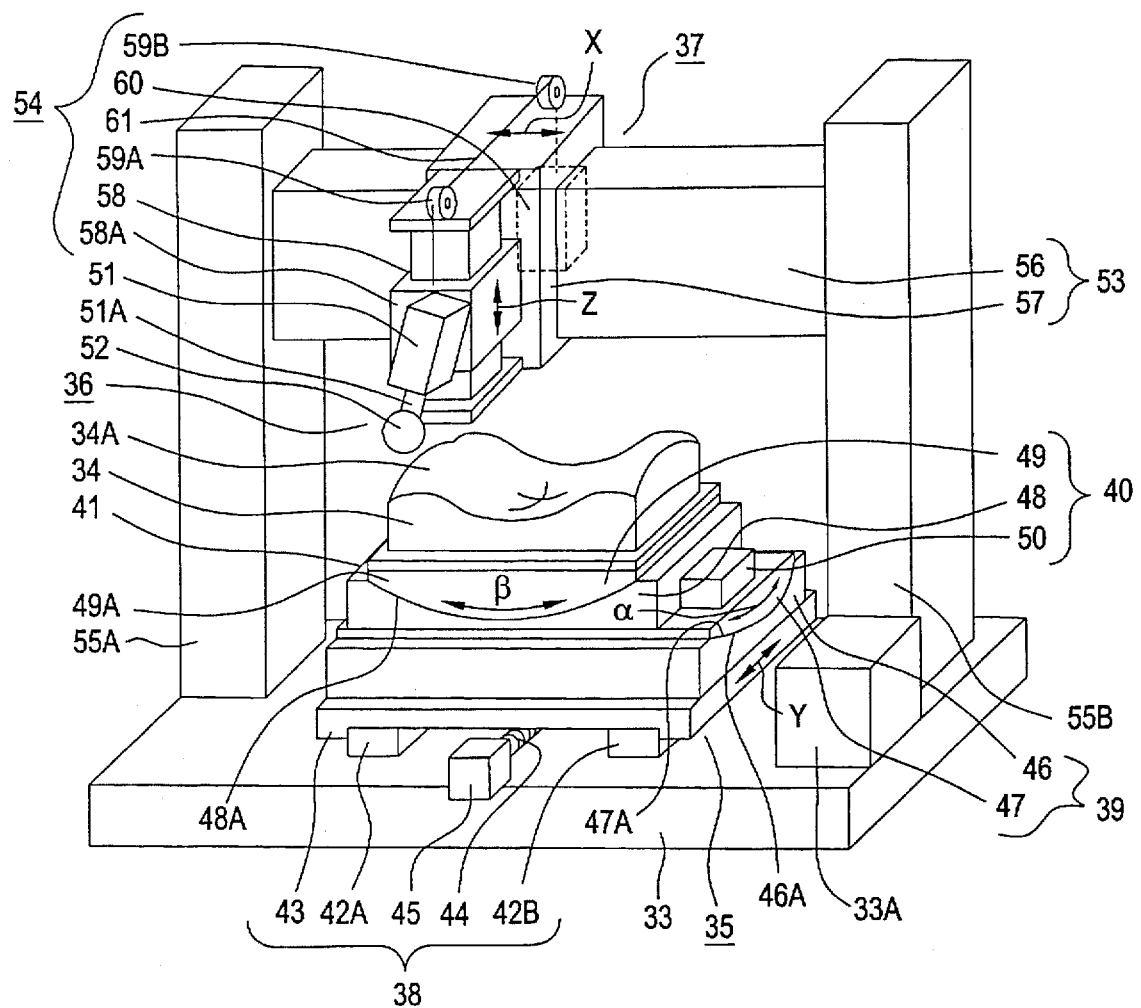
FIG. 1 is an explanatory view of the first embodiment of the abrasive device of the present invention.

FIG. 1 shows an abrasive device of the first embodiment of the present invention utilized for the abrading process on an aspherical surface. The abrasive device comprises a supporting level block 33, a table drive 35 mounted on the supporting level block 33 for supporting and moving a workpiece 34, an abrading head 36 being located against a work surface 34A of the workpiece 34 for abrading the work surface 34A, a head supporting mechanism 37 for supporting the abrading head 36 at any point on the X-axis direction and for moving the abrading head 36 upward and downward in response to a configuration of the work surface 34A and the drive controller 33A for controlling respective mechanisms synchronously.

The table drive 35 comprises a Y-axis mechanism 38 for moving the workpiece 34 horizontally in the Y-axis direction, an α-direction mechanism 39 mounted on the Y-axis mechanism 38 for moving the workpiece 34 along to the α-direction, i.e., a direction along to a circular arc having a central axis parallel to the X-axis, β-direction mechanism 40 mounted on the α-direction mechanism 39 for moving the workpiece 34 along to the β-direction, i.e., a direction along to a circular arc having a central axis parallel to the Y-axis, and a fixing jig 41 mounted on the β-direction mechanism for adjusting and fixing a position of the workpiece 34 thereon.

The Y-axis mechanism 38 comprises two parallel guides 42A and 42B being positioned along to the Y-axis direction on the supporting level block 33, Y-axis table 43 slidably engaged to both parallel guides 42A and 42B, a ball screw 44 being gear-engaged with an inner nut (not shown) of the Y-axis table 43, which is positioned in parallel to both guides 42A and 42B and a servo motor 45 having a drive shaft mechanically engaged to one end of the ball screw 44 for moving and adjusting the position of Y-axis table 43 in the Y-axis direction by rotating the ball screw 44.

The α-direction mechanism 39 comprises a circular arc guide 46 having a recessed circular arc surface 46A having a center curvature parallel to the X-axis, which is mounted on the Y-axis table 43, an α-direction table 47 having a circular convex surface 47A having a center curvature parallel to the X-axis, which is slidably adjusted to the recessed circular arc surface 46A of the circular arc guide 46 for allowing the movement of the α-direction table 47 along to the α-direction, a ball screw (not shown) being gear-engaged with an inner nut (not shown) of the α-direction table 47 and a servo motor (not shown) having a drive shaft mechanically engaged to one end of the ball screw (not shown) for moving and adjusting the position of α-direction table in the α-direction by rotating the ball screw (not shown).

The β-direction mechanism 40 comprises a circular arc guide 48 having a recessed circular arc surface 48A having a center curvature parallel to the Y-axis, which is mounted on the α-direction table 47, a β-direction table 49 having a circular convex surface 49A having a center curvature parallel to the Y-axis, which is slidably adjusted to the recessed circular arc surface 48A of the circular arc guide 48 for allowing the movement of the β-direction table 49 along to the β-direction, a ball screw (not shown) being gear-engaged with an inner nut (not shown) of the β-direction table 49 and a servo motor (not shown) having a drive shaft mechanically engaged to one end of the ball screw (not shown) for moving and adjusting the position of β-direction table in the β-direction by rotating the ball screw (not shown).

The abrading head 36 comprises a spindle 51 being engaged to a drive (not shown) for generating a rotating torque and an abrading tip 52 mechanically engaged to a tip of a driving shaft 51A of the spindle 51 for abrading the work surface 34A by utilizing the rotating torque.

The head supporting mechanism 37 comprises an X-axis mechanism 53 for moving the abrading head 36 horizontally within the X-axis and a vertical movement mechanism 54 for moving the abrading head 36 upward and downward in response to the configuration of the work surface 34A.

The X-axis mechanism 53 comprises columns 55A and 55B mounted on the supporting level block 33, a guide 56 supported by both columns 55A and 55B so as to be extended along to the X-axis, an X-axis slider 57 slidably engaged to the guide 56, a ball screw (not shown) being gear-engaged with an inner nut of the X-axis slider 57 and a servo motor (not shown) having a drive shaft mechanically engaged to one end of the ball screw (not shown) for moving and adjusting the position of X-slider 57 within the X-axis.

The vertical movement mechanism 54 comprises a slide mechanism 58 having a vertically movable slider 58A fixing a spindle 51 thereon for guiding the vertical movement of the abrading head 36 and maintaining the position of the abrading head 36 constant, pulleys 59A and 59B and a wire 61 having two ends one of which is engaged to a weight block 60 and the other is engaged to the slider 58A, which is extended between both pulleys. The weight of the weight block 60 is set to less weight in a certain amount than the total weight of the slider 58A, the spindle 51 and the abrading tip 52. Therefore, the abrading tip 52 contacts the work surface 34A with a certain pressing force that is equal to a weight subtracting the weight of the weight block 60 from the total weight of the slider 58A, the spindle 51 and the abrading tip 52 while the weight block 60 is moved upwardly for compensating the total displacement of the moving of the abrading tip 52 and the abrading tip 52 is moved downwardly in response to the configuration of the work surface 34A, or while the weight block 60 is moved downwardly for compensating the total displacement of the moving of the abrading tip 52 and the abrading tip 52 is moved upwardly in response to the configuration of the work surface 34A.

The drive controller 33A synchronously controls both movements of two driving axes defined by Y-axis mechanism 38 and X-axis mechanism 53, which are referred to as "horizontal axis moving", and the movements of two driving directions defined by the α-direction mechanism 39 and the β-direction mechanism 40 which are referred to as "tilted direction moving", based on controlling data calculated by a microprocessor (not shown) so that the position of the abrading head 36 against to the work surface 34A is always maintained constant, i.e., the relative scanning of the abrading tip 52 with the work surface 34A is executed so that the pressing direction of the abrading tip 52 is consistent with the normal line on the work surface 34A and the driving shaft 51A maintains a specific angle against to the normal line on the working surface 34A.

Practical controls of the "horizontal axis moving" and the "tilted direction moving" are explained hereinafter.

Figure 2:
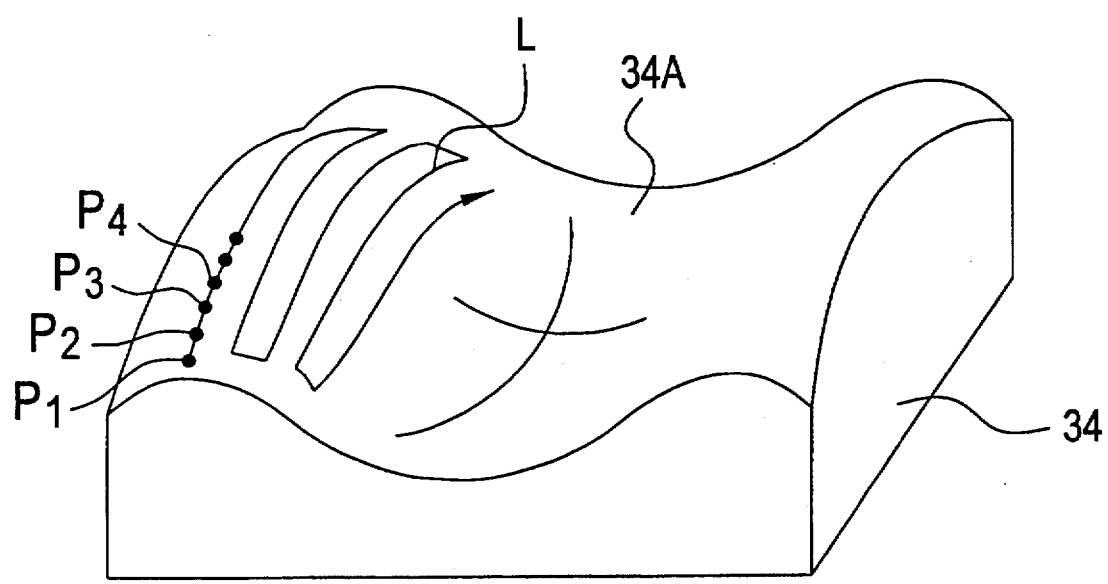
FIG. 2 is an explanatory view showing a scanning pattern of the abrasive device of the first embodiment of the present invention.

FIG. 2 shows a scanning pattern L when the abrading tip 52 moves on a work surface 34A contacting thereto at a predetermined scanning speed. The scanning pattern L is constituted by a scanning lines extended to a certain direction, a scanning lines extended to an opposite direction to the certain direction and a connecting lines therebetween perpendicular to those directions. The processor (not shown) calculates angles of the "tilted direction moving" required to set the work surface 34A horizontal at respective points P1, P2, . . . on the scanning pattern, positions of the "horizontal axis moving" required to set the contacting point of the abrading tip 52 on the work surface 34A at respective points P1, P2, . . . by compensating prospective position changes due to the "tilted direction moving" and scanning speeds required to scan the abrading tip 52 on the work surface 34A in a designated speed between respective points P1, P2,. The drive controller 33A controls both movements of two axes of Y-axis mechanism 38 and X-axis mechanism 53 and two directions of α-direction mechanism 39 and β-direction mechanism 40 synchronously based on the calculated driving data, i.e., angle data, position data and speed data respectively.

Figure 3:
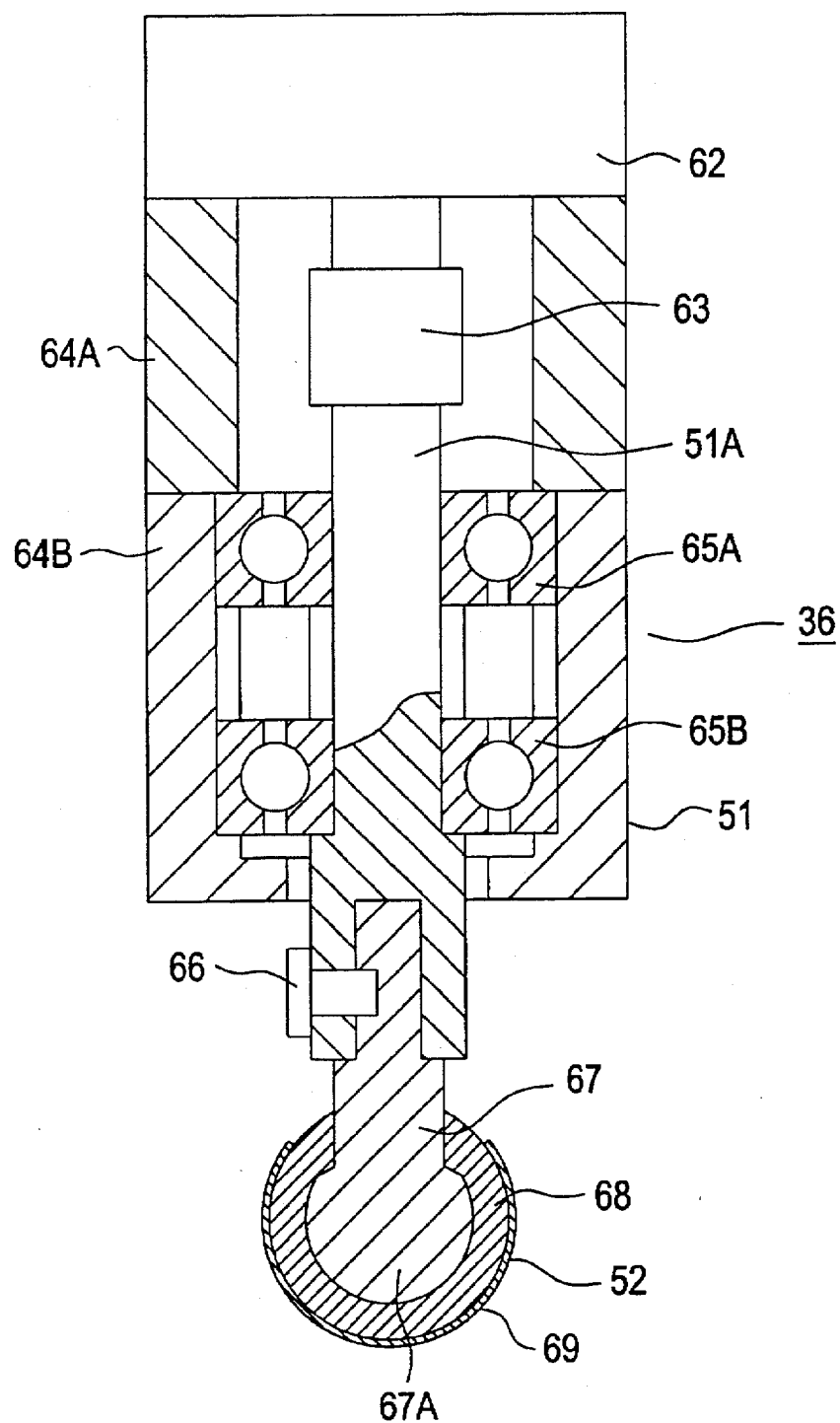
FIG. 3 is a cross-sectional view of the abrading head of the first embodiment of the abrading device of the present invention.

FIG. 3 shows a cross-sectional structure of the abrading head 36. The spindle 51 comprises a servo motor 62 in which a revolution speed is controlled by a driver (not shown), a driving shaft 51A that is mechanically engaged to a driving shaft of the servo motor 62 through a coupling 63 and bearings 65A and 65B mounted by brackets 64A and 64B for supporting the driving shaft 51A. The abrading tip 52 comprises a shaft core 67 that can be easily replaced for alternative ones depending on unique sizes or materials of the workpiece 34, which is detachably mounted on the driving shaft 51A through a securing pin 66 consistently with the rotating center of the rotating shaft 52, an elastic member 68 constituted from a soft material having not more than 1 kgf/mm$^2$ elasticity, such as silicone rubber or the like, which is formed as a spherical shape having not more than 50 mm diameter on an outer surface of the spherical portion 67A of the tip of the shaft core 67, and a polisher 69 holding abrasive thereon formed on the elastic member 68 for abrading the work surface 34A.

The abrasive method using the aforementioned abrasive device is explained hereinafter.

Primarily, abrasive is applied onto the work surface 34A of the workpiece 34 and the abrading tip 52 contacts the work surface 34A with a slight force by adjusting a load of the weight block 60. Then, the abrading process on the work surface 34A of the workpiece 34 is performed by rotating the abrading tip 52 by actuating the motor 62 of the spindle 51. At the same time, the drive controller 33A outputs certain control signals toward respective drivers of the servo motor 45, 50 and servo motors of each α-direction mechanism 39 and X-axis mechanism 50 based on the data calculated by the processor and controls the horizontal positions of each Y-axis table 43 and X-axis slider 57 and rotating positions of each α-direction table 47 and β-direction table 49 so that the abrading head 36 is always directed toward a certain position against the work surface 34A. In other words, the pressing direction of the abrading tip 52 is always consistent with the normal line at the contact point on the working surface 34A and the rotating shaft 51A always maintains a certain fixed angle with the normal line at the contact point on the work surface 34A while the abrading tip 52 scans the work surface 34A. At this time, since the abrading tip 52 moves upward or downward in response to an altitude of each point P1, P2, . . . on the scanning pattern L along to the upward or downward movement of the slider 58A of the slide mechanism 58, the abrading tip 52 performs the abrading process with a certain constant pressing force that is equal to a weight subtracting the weight of the weight block 60 from the total weight of the slider 58A, the spindle 51 and the abrading tip 52.

In this embodiment, the abrading tip 52 having a substantially spherical shape and a elasticity scans the work surface 34A so that the pressing direction of the abrading tip 52 is always consistent with the normal line at any contact point on the working surface 34A and the rotating shaft 51A always maintains a certain fixed angle with the normal line at any contact point on the work surface 34A while the abrading tip 52 scans the work surface 34A. When this abrading method is once utilized, and if the curvature of the work surface 34A is changed according to the scanning of the abrading tip 52, the contact area or pressing force distribution of the abrading tip 52 on the workpiece 34A is still maintained constant because other portions of abrading tip 52 tend not to be contacted to the work surface 34A. Even if those portions are contacted thereto, the elastic member 68 absorbs such changes on the work surface 34A. In addition, even when the curvatures on the work surface 34A is varied in respective contacting points, the pressing force distribution of the abrading head 52 is still maintained constant because of the same reason mentioned above.

Figure 4A:
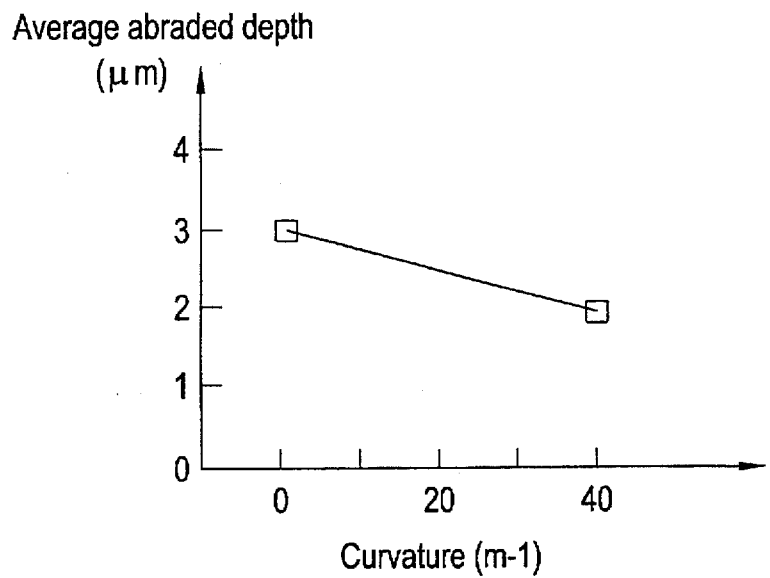
FIGS. 4(a) and 4(b) are graphs showing results of measurements of the relationship between average abrading depth and the variation of the curvature of the work surface.
Figure 4B:
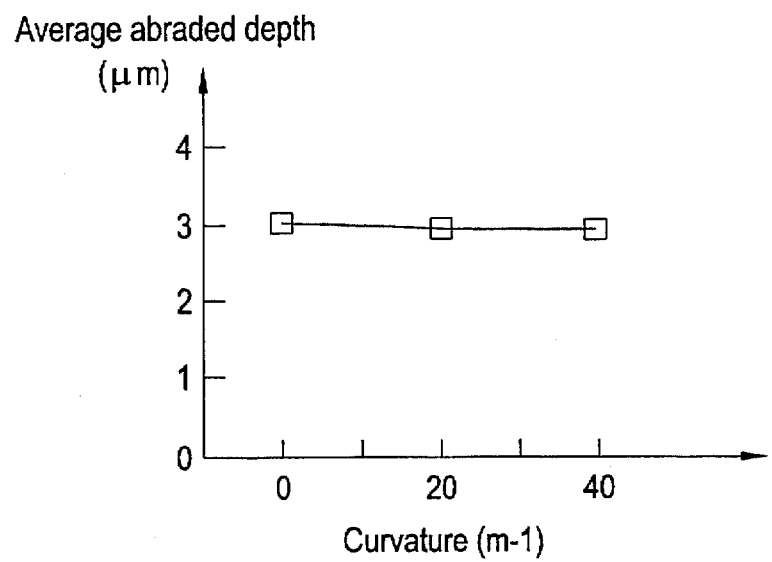

FIGS. 4(a) and 4(b) show a result of the measurement of the relationship between an average abraded depth and a variation of surface curvature of the work surface. More specifically, FIG. 4(a) shows the result when the abrading process is executed by using a cylindrical abrading tip having 10 mm diameter, and FIG. 4(b) shows the result when the abrading process is executed by using a spherical abrading tip having 40 mm diameter. The conditions of the measurement for both results were set as that the pressing force of the abrading tip is 2N, the rotating speed of the abrading tip is 600 rpm, the moving speed of the abrading tip is 200 mm/min and pitch of the scanning pattern is 0.2 mm. Several cylindrical surfaces each having a unique curvature were utilized for as the curved surface to be abraded and the measurement was performed on respective surfaces. The angle of the rotating shaft to the working surface was fixed consistent with the normal line of the work surface and the number of times of the abrading process was adjusted so that the average abraded depth of the work surface was 3 μm when the curvature of the surface is 0 m−1, i.e., planar surface. From those results, it is understood that a constant abraded depth was not obtained in a case of FIG. 4(a) because the average abraded depth varied along with the changes of curvature of the work surface; however, substantially constant average abraded depth was obtained in a case of FIG. 4(b) regardless of the variation of curvatures. Thus, by using this abrasive device and method, an aspherical surface having no axis in rotative symmetry is abraded in high processing precision because the unit abraded amount is maintained constant.

Figure 5:
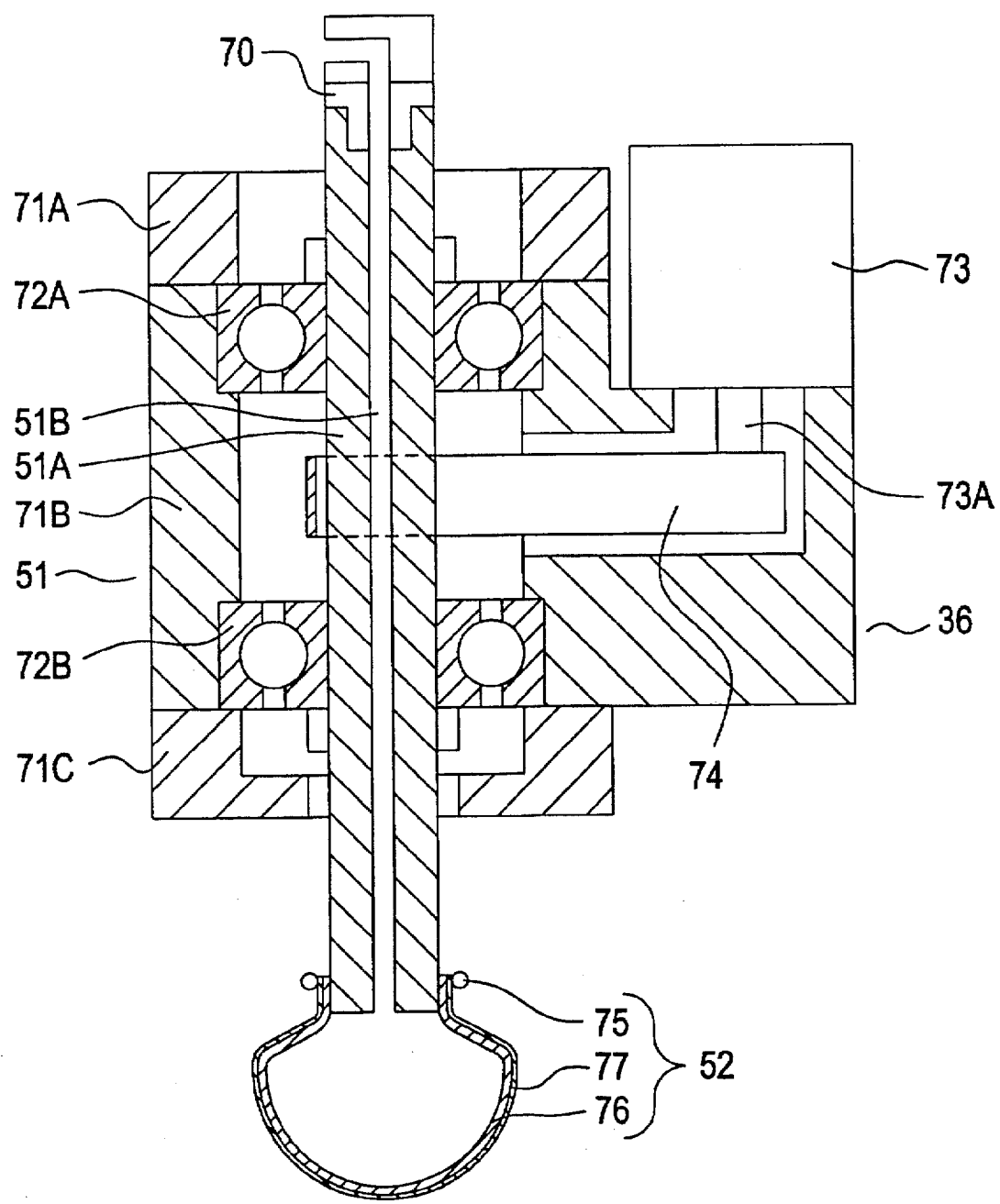
FIG. 5 is a cross-sectional view of the abrading head of the second embodiment of the abrading device of the present invention.

FIG. 5 shows another configuration of the abrading head 36 as a second embodiment of the abrading device of the present invention. The spindle 51 comprises a rotating shaft 51A having a hollow 51B, which has two ends one of which can be connected to an air pump (not shown) through the joint 70 and the other is mechanically engaged to the abrading tip 52, bearings 72A and 72B being fixed by brackets 71A, 71B and 71C for rotatably supporting the rotating shaft 51A, a servo motor 73 in which the rotating speed is controlled by a driver (not shown), and a drive belt 74 extended between the driving shaft 73A of the servo motor 73 and the rotating shaft 51A. The abrading tip 52 that is fixed onto the one end of the rotating shaft 51A through the ring 75 comprises an air-tight bag member 77 composed from an elastic member and a polisher 76 formed on the surface of the air-tight bag member. The air-tight bag member 77 is expandable when air is injected thereto from the air pump through the hollow 51B of the rotating shaft 51A. Since other configurations of the second embodiment are the same with those of the first embodiment, detailed descriptions thereto are omitted.

In this configuration, since the variation of the curvature on the work surface 34 of the workpiece 34 is also absorbed by the bag member 77, contact area or pressing force distribution of the abrading tip 52 on the work surface is also maintained constant. Therefore, an aspherical surface having no axis in rotative symmetry is abraded in high processing precision because the unit abraded amount is also maintained constant in this embodiment.

Figure 6:
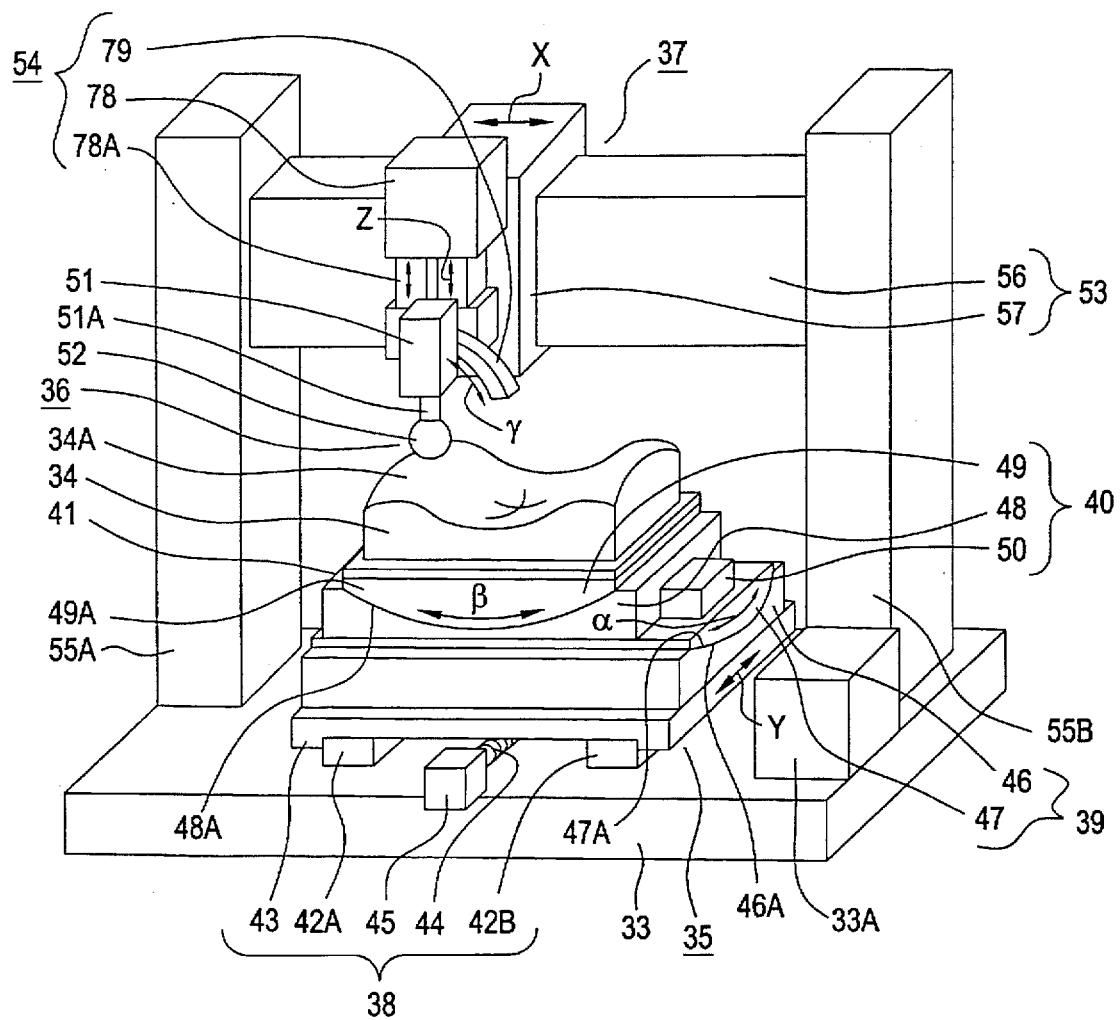
FIG. 6 is an explanatory view of the third embodiment of the abrading device of the present invention.

FIG. 6 shows a configuration of the third embodiment of the abrasive device of the present invention. In this figure, like reference numbers denote like parts with that of FIG. 1, and a detailed description thereto is omitted. In this embodiment, the vertical movement mechanism 54 comprises an air cylinder mechanism 78 fixed onto the X-axis slider 57 for moving a cylinder portion 78A upward or downward in response to the configuration of the work surface 34A. The pressure of the cylinder portion 78A is controlled by electric-air pressure converter and driver (both not shown) and a circular arc guide 79 for slidably supporting a spindle 51 on the cylinder 78 for sliding the spindle within γ-direction around the tip of the abrading tip 52 as a rotating center.

The circular arc guide 79 is configured so that the angle of the driving shaft 51A of the spindle 51 to the normal line on the work surface 34A where the abrading tip 52 is contacted is manually adjustable. The position of the spindle 51 is also adjustable so that the angle is set to relatively wide at a rough abrading process that requires relatively high abraded amount of the workpiece 34, and the angle is set to relatively narrow, preferably zero, at a finishing abrading process that requires good surface roughness of the work surface 34A.

The drive controller 33A synchronously controls both the Y-axis mechanism 38 and the X-axis mechanism 39 as "horizontal axis moving" and the α-direction mechanism and the β-direction mechanism as "tilted direction moving" based on the driving data calculated by the processor while the drive controller also controls the air pressure of the air cylinder mechanism 78, i.e., corresponding to the controlled pressing force of the abrading tip 52. The processor calculates the driving data for the pressing force so that the practical pressing force is adjusted based on a weighting factor of a standard pressing force, which corresponds to an abrading amount required to adjust the configuration of the work surface to an objective configuration thereof.

The abrasive method utilizing the abrasive device of the third embodiment of the present invention is described in detail hereinafter.

As a rough abrading process on the workpiece 34, primarily, abrasive is applied uniformly onto the work surface 34A of the workpiece 34, and the position of the spindle 51 is manually adjusted along to the circular arc guide 79 so that the driving shaft 51A of the abrading head 36 and the direction of the normal line on the surface of the work surface 34A where the abrading tip 52 is contacted is kept in a constant angle. Then, the cylinder portion 78A of the air cylinder mechanism 78 moves downward being controlled by the driver of the drive controller 33A that controls the air pressure of the air cylinder mechanism 78 and the abrading tip 52 is pressed onto the work surface 34A in a certain constant force controlled by the driving data. At the same time, the drive controller 33A outputs control signals toward respective drivers of the servo motor 45, 50 and servo motors of each α-direction mechanism 39 and X-axis mechanism 50 based on the data calculated in the processor and controls the horizontal positions of each Y-axis table 43 and X-axis slider 57 and rotated positions of each α-direction table 47 and β-direction table 49 so that the abrading head 36 is always directed toward a certain position against the work surface 34A. In other words, the pressing direction of the abrading tip 52 is always consistent with the normal line at any contact point on the working surface 34A and the driving shaft 51A always maintains a certain constant angle with the normal line at the contact point on the work surface 34A while the abrading tip 52 scans the work surface 34A. At this time, although the altitude of the work surface 34A changes along to the altitudes of respective points P1, P2, . . . of the scanning pattern L, since the drive controller 33A controls the driver of the air cylinder mechanism 78 based on the driving data and moves the cylinder portion 78A upward or downward, the abrading tip 52 is pressed onto the work surface 34A in a certain constant force corresponding to the driving data. Then, as a finishing abrading process on the workpiece 34, the spindle 51 is manually slid along to the circular arc guide 79 so that the driving shaft 51A of the abrading head 36 is consistent with the direction of the normal line on the work surface 34A where the abrading tip 52 makes contact. The finishing abrading process is performed on the work surface 34A by similar process with that of the rough abrading process. Thus, since the rotational movement of the rotating abrading tip 52 on the work surface 34 is the omnidirective movement, the work surface 34A is finished as a smooth surface without abrading orientations.

In the third embodiment of the present invention, similar to the first embodiment, the contact area or the pressing force distribution of the abrading tip 52 is kept in constant regardless of the curvature variations of the work surface 34A of the workpiece 34, and the workpiece 34 is finished as an aspherical surface with high processing precision. Also, high-effective abrading process is performed since the total amount of the work surface to be abraded is controlled by adjusting the angle of the driving shaft 51A. Furthermore, even if the scanning speed of the abrading tip 52 is kept in a relatively slow constant speed, since the amount of the workpiece to be abraded can be adjusted at respective scanning points by controlling the pressing force of the abrading tip 52, prospective impreciseness of the abrading process due to such slow scanning speed is also avoided. The same effect is also obtained by controlling the rotating speed of the abrading tip 52, instead of controlling the pressing force of the abrading tip 52.

Figure 7:
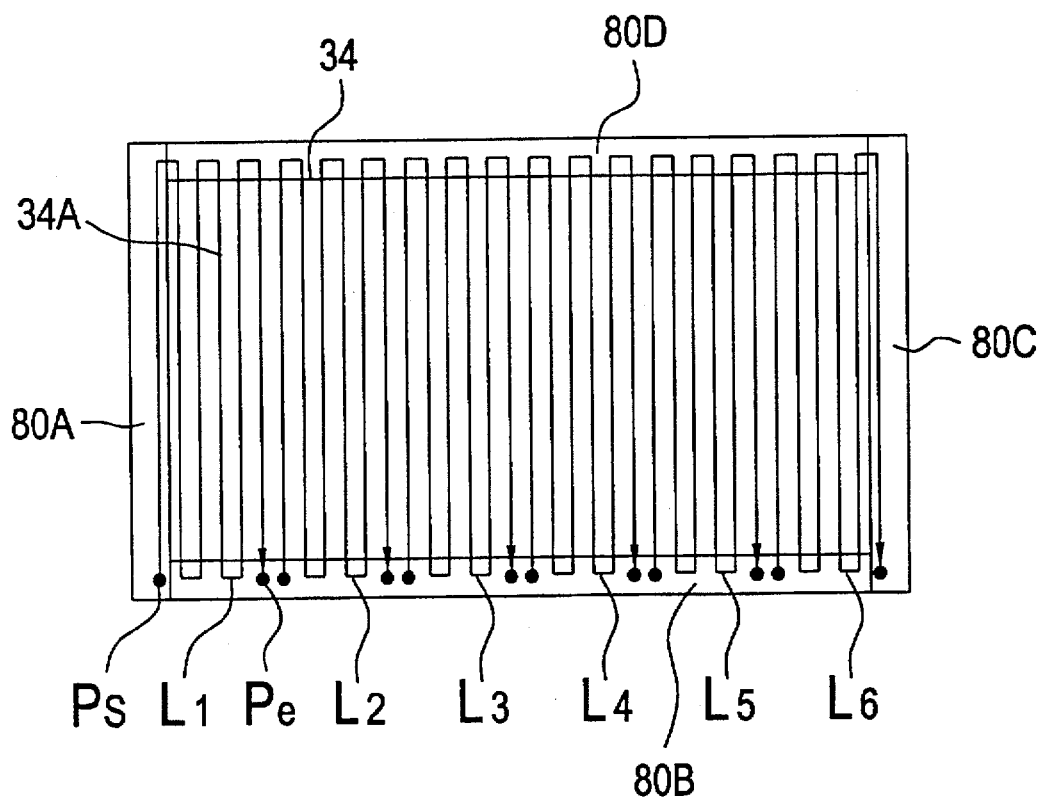
FIG. 7 is an explanatory view showing a scanning pattern of the abrading tip of the fourth embodiment of the abrading device of the present invention.

FIG. 7 shows a scanning pattern of the abrading device of the fourth embodiment of the present invention. In this embodiment, the abrading process is performed by using divided six scanning patterns $L_1, L_2, \ldots$ and $L_6$ of the abrading head 32 on the work surface 34A using the same abrading device of the first embodiment of the present invention. Four splits 80A, 80B, 80C and 80D, i.e., unnecessary parts that are separated form the workpiece after the abrading process, are attached around the workpiece 34 and abrading starting point $P_s$, abrading stopping point $P_e$, and abrading turning points $P_t$ are located on those splits because the abrading precision at those points are usually low. Also, since processing precision at both ends of the workpiece 34A tend to be low, the beginning portion of the scanning line $L_1$ and ending portion of the scanning line $L_2$ are also positioned on splits 80A and 80C respectively. The processor and the drive controller 33A execute the scanning pattern L1, L2, . . . and L6 in this order and respective processed surface is finished as a uniformly abraded surface.

In the fourth embodiment, since the scanning patterns on the work surface are divided, total amount of driving data outputted form the processor per unit time is effectively reduced and the total amount of memory is also reduced to reduce the manufacturing cost of the abrasive device.

Figure 8:
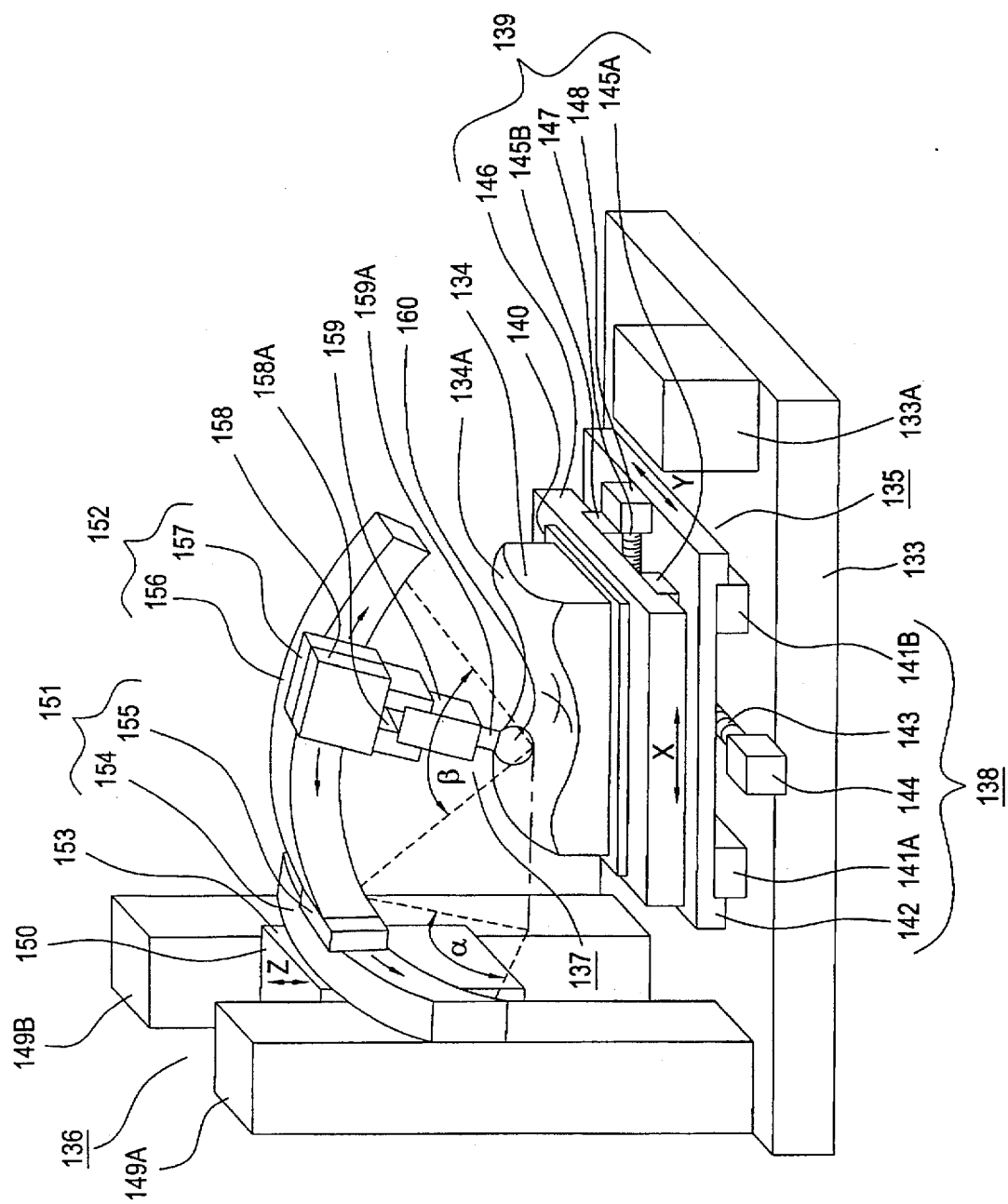
FIG. 8 is an explanatory view of the fifth embodiment of the abrading device of the present invention.

FIG. 8 shows a configuration of the fifth embodiment of the abrasive device of the present invention. The abrasive device comprises a level block 133, a table drive 135 mounted on the level block 133 for supporting and moving a workpiece 134, an abrading head supporting mechanism 136 for supporting an abrading head 137 and locating the abrading head above a work surface 134A of the workpiece 134 and a drive controller 133A for controlling the driving of the abrading device.

The table drive 135 comprises a Y-axis mechanism 138 for moving the workpiece 134 horizontally in the Y-axis direction, an X-axis mechanism 139 for moving the workpiece 134 horizontally in the X-axis direction and a fixing jig 140 mounted on the X-axis mechanism for fixing a position of the workpiece 134 thereon.

The Y-axis mechanism 138 comprises two parallel guides 141A and 141B being positioned along to the Y-axis direction on the level block 133, a Y-axis table 142 slidably engaged both parallel guides 141A and 141B, a ball screw 143 being gear-engaged with an inner nut (not shown) of the Y-axis table 142, which is positioned in parallel to both guides 141A and 141B and a servo motor 144 having a drive shaft mechanically engaged to one end of the ball screw 143 for moving and adjusting the position of the Y-axis table 142 in the Y-axis direction by rotating the ball screw 143.

The X-axis mechanism 139 comprises two parallel guides 145A and 145B being positioned along to the X-axis direction on the Y-axis table 142, an X-axis table 146 slidably engaged to both parallel guides 145A and 145B, a ball screw 147 being gear-engaged with an inner nut (not shown) of the X-axis table 146, which is positioned in parallel to both guides 145A and 145B and a servo motor 148 having a drive shaft mechanically engaged to one end of the ball screw 147 for moving and adjusting the position of the X-axis table 146 in the X-axis direction by rotating the ball screw 147.

The abrading head supporting mechanism 136 comprises a Z-axis mechanism 150 for controlling a moving of the abrading head 137 in Z-axis direction, which is located and slidably engaged between two columns 149A and 149B both are mounted on the level block 133, an α-direction mechanism 151 mounted on the Z-axis mechanism 150 for controlling a rotational movement of the abrading head 137 in α-direction, i.e, a direction along to an circular arc having a center axis parallel to the X-axis, and a β-direction mechanism 152 mounted on the α-axis mechanism 151 for controlling a rotational movement of the abrading head 137 in β-direction, i.e, a direction along to an circular arc having a center axis parallel to the Y-axis.

The Z-axis mechanism 150 has a Z-axis slider 153 slidably mounted on a guide (not shown), which is moved along to the Z-axis by a servo motor and a ball screw (both not shown) to adjust its position.

The β-direction mechanism 152 comprises a circular arc guide 156 having a center axis of curvature parallel to the Y-axis and a β-direction slider 157 capable of moving along with the circular arc guide 156 and positioning in a certain point thereon.

The abrading head 137 comprises an air cylinder mechanism 158 fixed onto the β-direction slider 157 for pressing an abrading tip 160 onto the work surface 134A in a certain pressure by controlling an air pressure of the air cylinder mechanism by electric-air pressure converter and driver (both not shown), a spindle 159 mounted on a cylinder portion 158A of the air cylinder 158 for generating a rotating torque by a driver (not shown) and a substantially spherical abrading tip 160 engaged on an end of the driving shaft 159A of the spindle 159 for abrading the work surface 134A.

The drive controller 133A synchronously controls three axial movements of Y-axis mechanism 138, X-axis mechanism 139 as horizontal moving mechanisms and Z-axis mechanism as vertical moving mechanism and two directive movements of the α-direction mechanism 151 and the β-direction mechanism 152 as tilting movement mechanisms along to respective circular arc members so that the loading axis of the abrading tip 60 is consistent with the normal line on the working surface 134A during the scanning of the abrading tip 60 in an abrading process.

The α-direction mechanism 151 and the β-direction mechanism 152 as the tilting movement mechanisms are explained in detail hereinafter.

Figure 9:
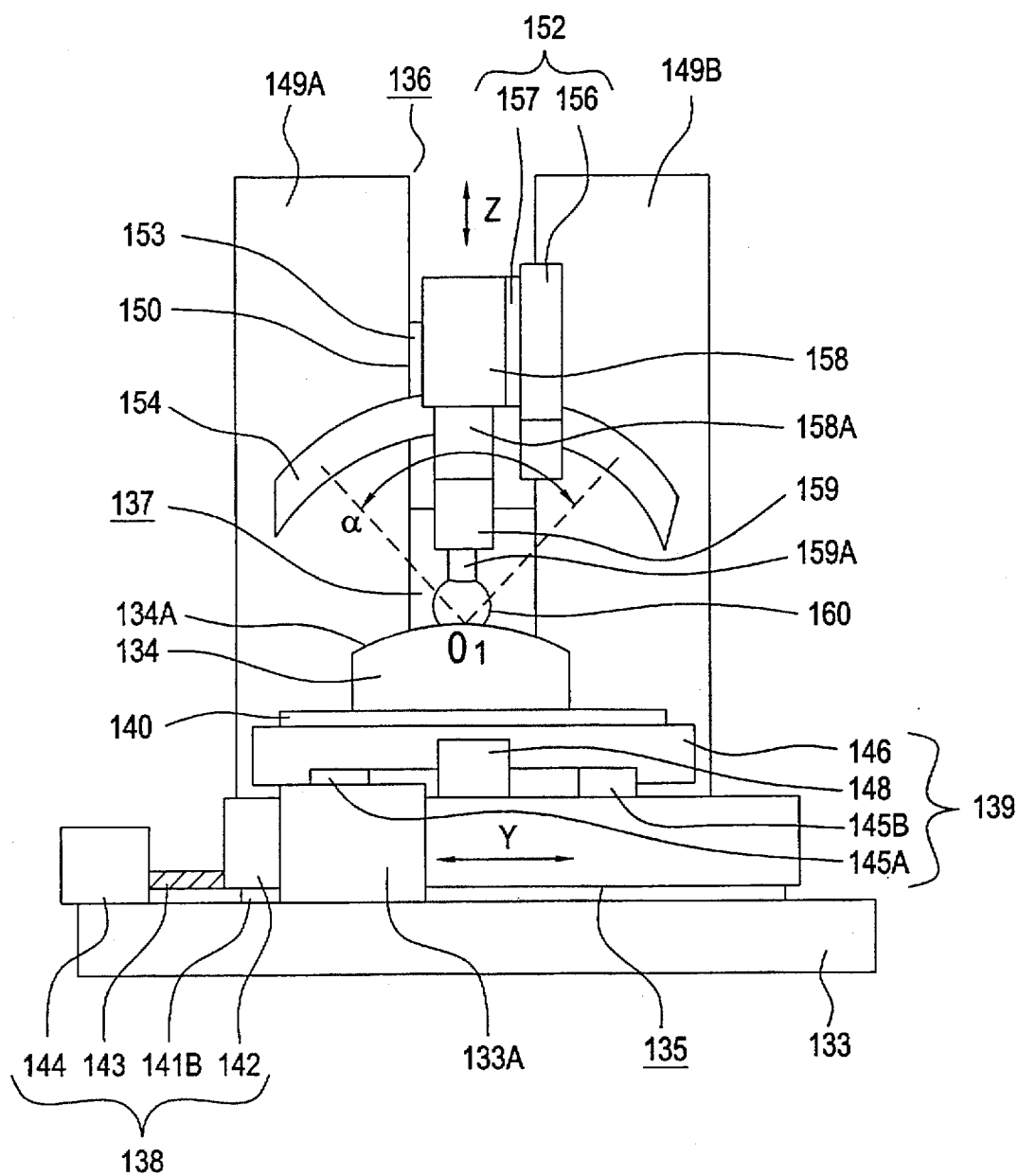
FIG. 9 is a Y-Z plan view of the fifth embodiment of the present invention disclosed in FIG. 8.
Figure 10:
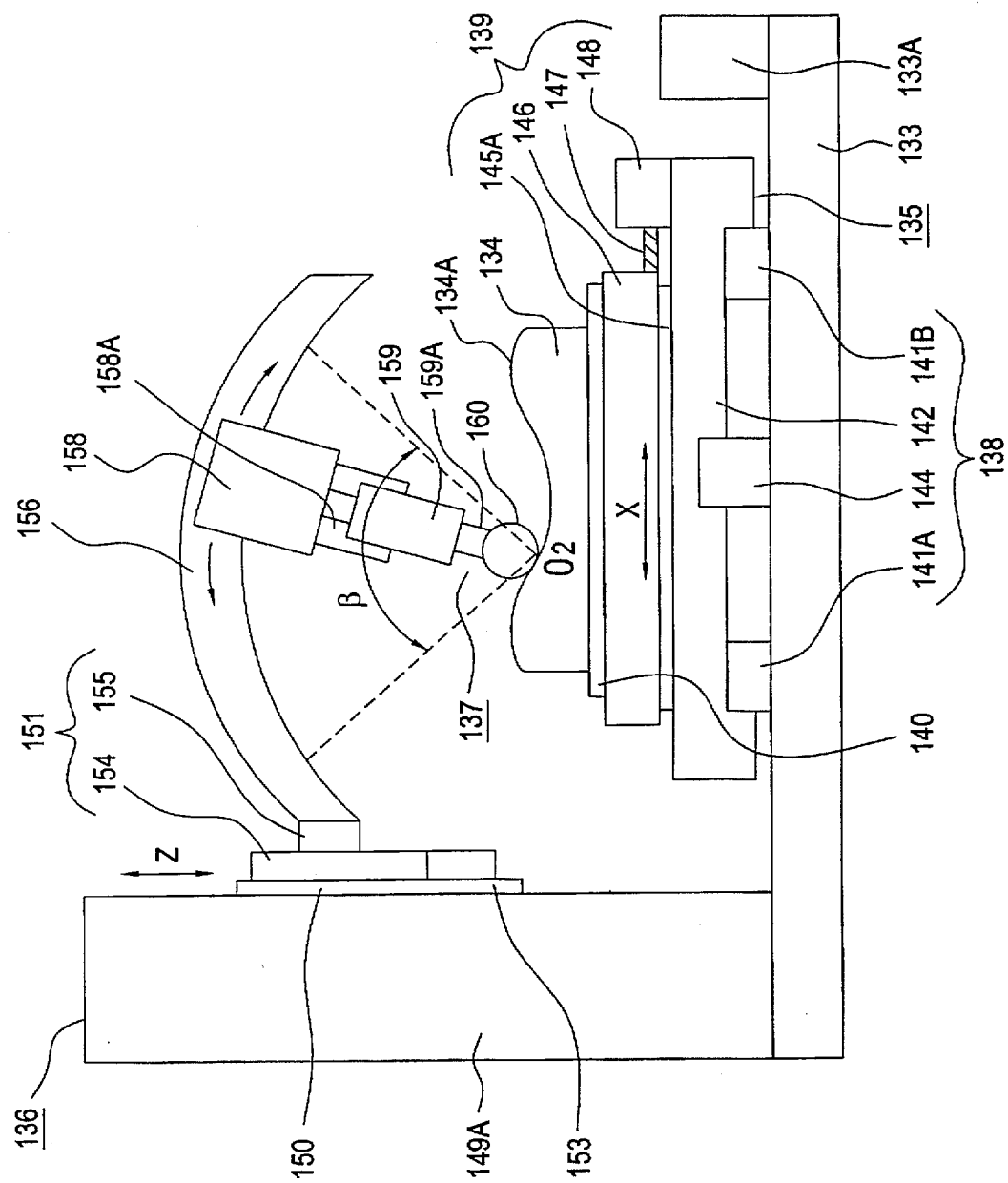
FIG. 10 is an X-Z plan view of the fifth embodiment of the present invention disclosed in FIG. 8.

FIG. 9 shows an Y,Z-plane view of the fifth embodiment of the present invention as shown in FIG. 8, and FIG. 10 shows an X, Z-plane view of the fifth embodiment of the present invention as shown in FIG. 8. As shown in FIGS. 9 and 10, the center $O_1$ of the curvature of the circular arc guide 154 of the α-direction mechanism 151 is configured so as to be consistent with the tip of the abrading tip 160 on a plane defined by both Y-axis and Z-axis, and the center O2 of the circular guide curvature of the circular arc guide 156 of the β-arc direction mechanism 152 is configured so as to be consistent with the tip of the abrading tip 160 on a plane defined by both X-axis and Z-axis. Therefore, the abrading head 137 is able to tilt in any angle within α-direction and β-direction around both rotational centers $O_1$ and $O_2$ by moving both α-direction slider and β-direction slider along thereto.

A practical abrading process for a curved surface utilizing the abrasive device mentioned above is explained hereinafter.

Primarily, abrasive is applied on the work surface 134A of the workpiece 134 and then the abrading tip 160 is positioned above the starting point of the abrading process on the work surface 134A of the workpiece 134 by moving the Z-axis slider 153 of the Z-axis mechanism 150 downward, and the abrading tip 160 is pressed onto the point on the work surface 134A in a certain pressing force by controlling the air pressure in the air cylinder 158. At the same time, the abrading tip 160 is rotated by the spindle 159 and the drive controller 133A outputs a certain control signals towards respective drivers of the servo motor 144 of the Y-axis mechanism 138, the servo motor 148 of the X-axis mechanism 139, the servo motor of the Z-axis mechanism, the servo motor of the α-direction mechanism 151 and the servo motor of β-direction mechanism 152 so as to synchronously control the horizontal positions of the X-axis table 146 and the Y-axis table 142, the vertical position of the Z-axis slider 153 and tilting positions of α-direction slider 155 and β-direction slider 157 based on the driving data calculated in the processor. Thus, the position of the abrading tip 160 is timely adjusted so that the loading axis, i.e., pressing direction, of the abrading tip 160 is consistent with the normal line at any point on the work surface 134A to scan the work surface 134A with the abrading tip 160. At this time, since the abrading head 137 is configured so as to tilt around the contacting point, i.e., the tip of the abrading tip 160, against the work surface 134, the vertical position or the horizontal position of the abrading tip 160 is not changed due to the tilting of the abrading head 137. Since the Y-axis mechanism 138 and the X-axis mechanism 139 is required only to move in correspondence with the scanning distance of the abrading head 137 in horizontal distance and the Z-axis mechanism 150 is required only to move in correspondence with the height of the work surface 134A in vertical direction, the scanning speed of the abrading tip 160 is able to compete with relatively high controlling speed, i.e., processing speed of data, even when the changes of the normal directions on the work surface 134A is relatively frequent. Therefore, the dwell time distribution of the abrading tip 160 is able to be consistent with the commanded scanning speed, i.e., an ideal distribution, to realize a processing precision.

Figure 11A:
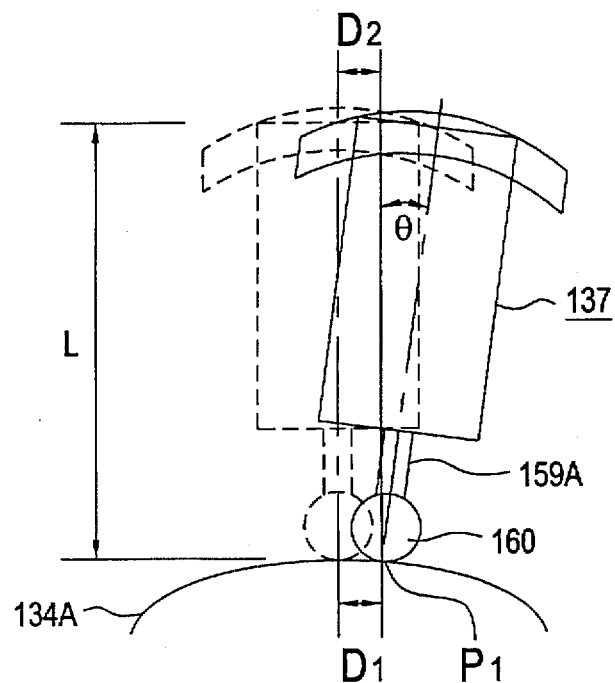
FIGS. 11(a) and 11(b) are explanatory views of the function of the vertical moving mechanisms in response to the position changes of the abrading head.
Figure 11B:
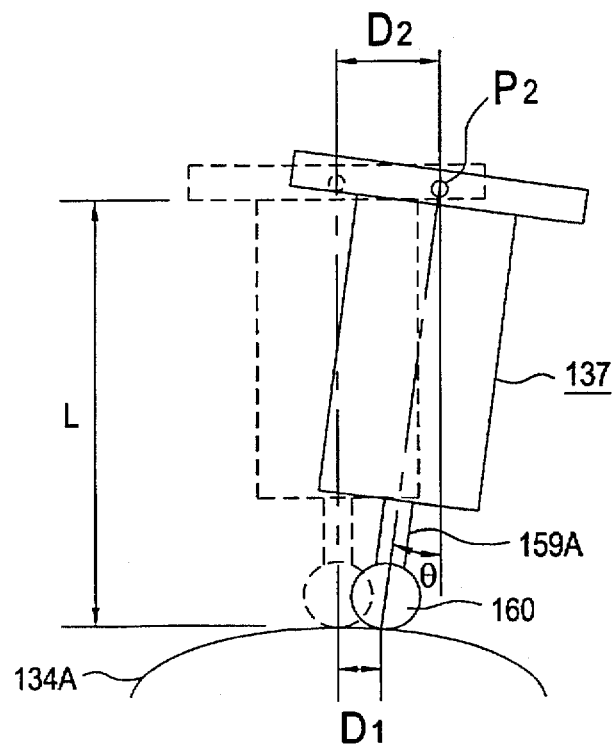

FIGS. 11(a) and 11(b) show movement of the horizontal mechanisms when the work surface 134A is scanned by the abrading tip 160 by gradually changing the position of the abrading head 137 so as to respond to the gradual change of the configurations of the work surface 134A. In FIGS. 11(a) and 11(b), the length L of the abrading tip 137 is 300 mm, the ideal scanning distance $D_1$ on the work surface 134 is 2 mm, the ideal scanning speed on the work surface 134A is 200 mm/sec and the range of the tilting angle θ of the abrading head 137 in correspondence with the surface configuration is 4.0°. In this case, as indicated in FIG. 11(a), when the position of the abrading head 137 is adjusted based on the rotational center $P_1$, i.e., a contacting point between the abrading tip 160 and the work surface 134A, since there are no changes on the horizontal movement of the abrading tip 160 due to the position changes of the abrading head 137, the practical moving distance $D_2$ in horizontal direction and the scanning speed of the abrading tip 160 are able to be set 2 mm and 200 mm/sec, respectively, as the ideal parameters. However, as indicated in FIG. 11(b), when the position of the abrading head 137 is adjusted based on a point $P_2$ far from the work surface 134A, since the horizontal position of the abrading tip 160 is changed in accordance with the position changes of the abrading head 137, the practical moving distance $D_2$ in horizontal direction and the scanning speed of the abrading tip 160 have to be set about 23 mm and 2300 mm/sec, which are about ten-times the magnitude of the ideal ones, respectively. Thus, the scanning speed of the device in FIG. 11 (b) is not able to compete the identical directed scanning speed due to the limitation of the mechanical movement structure to decrease the processing precision.

In the above case, the abrasive device is controlled based on two horizontal axes, one vertical axis and two directive movements; however, as the sixth embodiment of the present invention, the abrasive device may be controlled only by two horizontal axes and two directive movements in horizontal directions excluding the movement by vertical axis. In this case, the Z-axis mechanism 150 is configured so that the abrading head 137 is kept at a certain height and the air cylinder 158 is configured so that the cylinder portion 158A allows the tip of the abrading head 160 to swing in a certain range, such as a ten or more millimeters, from a standard position. In addition, in this case, the circular arc guide 154 is configured so that the center of the curvature $O_1$ is consistent with the position of the abrading tip 160 in a plane defined by both Y and Z axes when the abrading tip 160 is located at the standard position, and the circular arc guide 156 is configured so that the center of the curvature $O_2$ is consistent with the position of the abrading tip 160 in a plane defined by both X and Z axes when the abrading tip 160 is located at the standard position.

When a practical abrading process is executed by using the above mentioned abrasive device, primarily, abrasive is applied on the work surface 134A of the workpiece 134, and the abrading tip 160 is positioned above the starting point of the abrading process on the work surface 134A of the workpiece 134 by moving the Z-axis slider 153 of the Z-axis mechanism 150 downward and the abrading tip 160 is pressed onto the point on the work surface 134A in a certain pressing force by controlling the air pressure in the air cylinder 158. At the same time, the abrading tip 160 is rotated by the spindle 159, and the drive controller 133A outputs a certain control signals towards respective drivers of the servo motor 144 of the Y-axis mechanism 138, the servo motor 148 of the X-axis mechanism 139, the servo motor of the α-direction mechanism 151 and the servo motor of β-direction mechanism 152 so as to synchronously control the horizontal positions of the X-axis table 146 and the Y-axis table 142 and rotating positions of α-direction slider 155 and β-direction slider 157 based on the driving data calculated in the processor. In this case, although the position where the abrading tip 160 is pressed varies due to the variation of the altitude of the work surface 134A, the abrading tip 160 is always pressed onto the work surface 134A in a constant force because the cylinder portion 158 of the air cylinder 158 lets the abrading tip 160 swing during the abrading process. The variation of the position where the abrading tip is pressed onto the work surface 134 due to the swing movement of the abrading tip 160 is compensated when the driving data are calculated in the processor.

Figure 12:
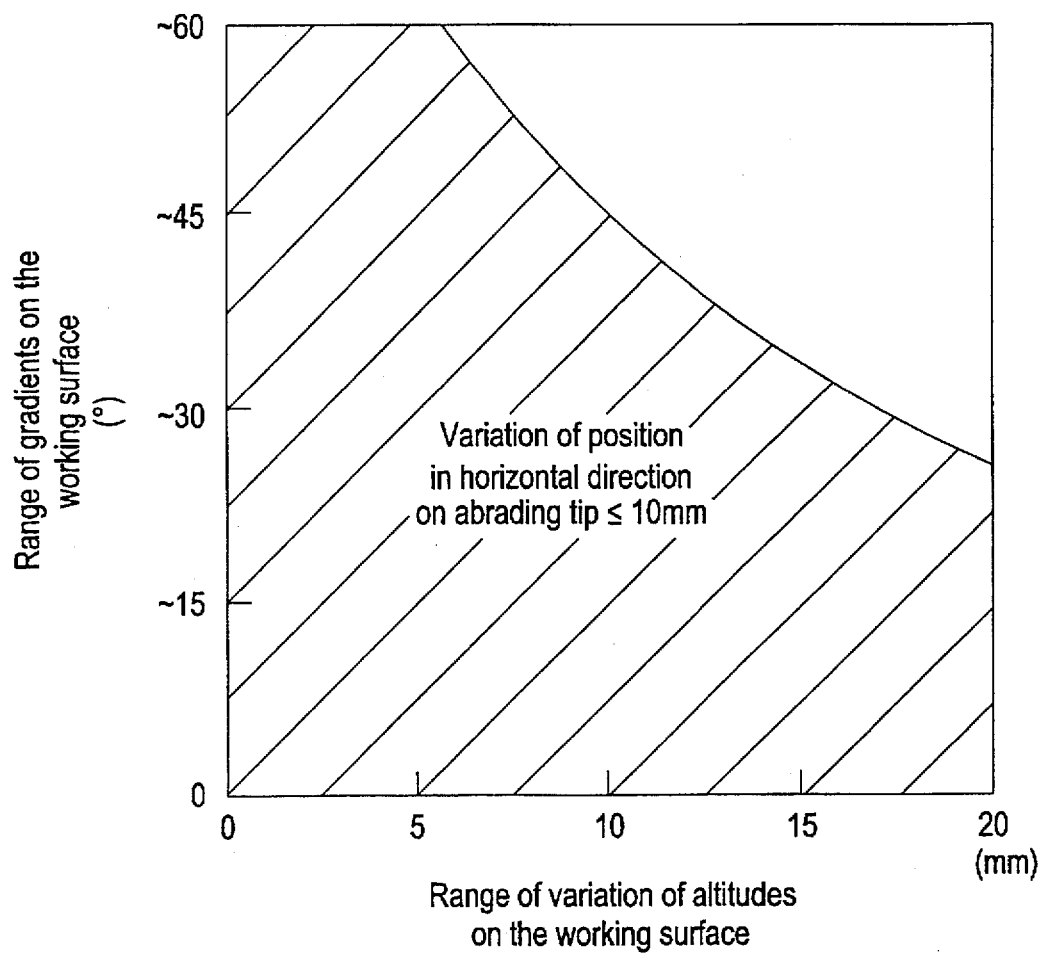
FIG. 12 is an explanatory view of the effective range of the work surface compensated by the fifth embodiment of the abrading device of the present invention.

FIG. 12 shows an example of an effective range of the abrasive device of the present invention against the range of variation of altitudes and gradients of the work surface 134A. By this figure, the variation of the position where the abrading tip is pressed due to the swing movement of the abrading tip 160 is easily compensated when the work surface 134A has a variation of the altitudes within 20 mm or a variation of the gradients within 45° because, in this case, the variation of the position of the abrading tip 160 in horizontal directions is effectively controlled within 10 mm for the entire work surface 134.

Thus, the practical scanning speed of the abrading tip 160 is able to compete with the commanded scanning speed because the variations of the position of the abrading tip 160 in horizontal direction or vertical direction is also maintained relatively low because of the self-position control of the abrading head 137 even if the Z-axis control is neglected. Therefore, the dwell time distribution of the abrading head is consistent with the commanded one, the processing precision is also obtained. In addition, the configuration of the abrading device is much simpler to reduce the manufacturing cost of the abrasive device because the Z-axis control is neglected.

Figure 13:
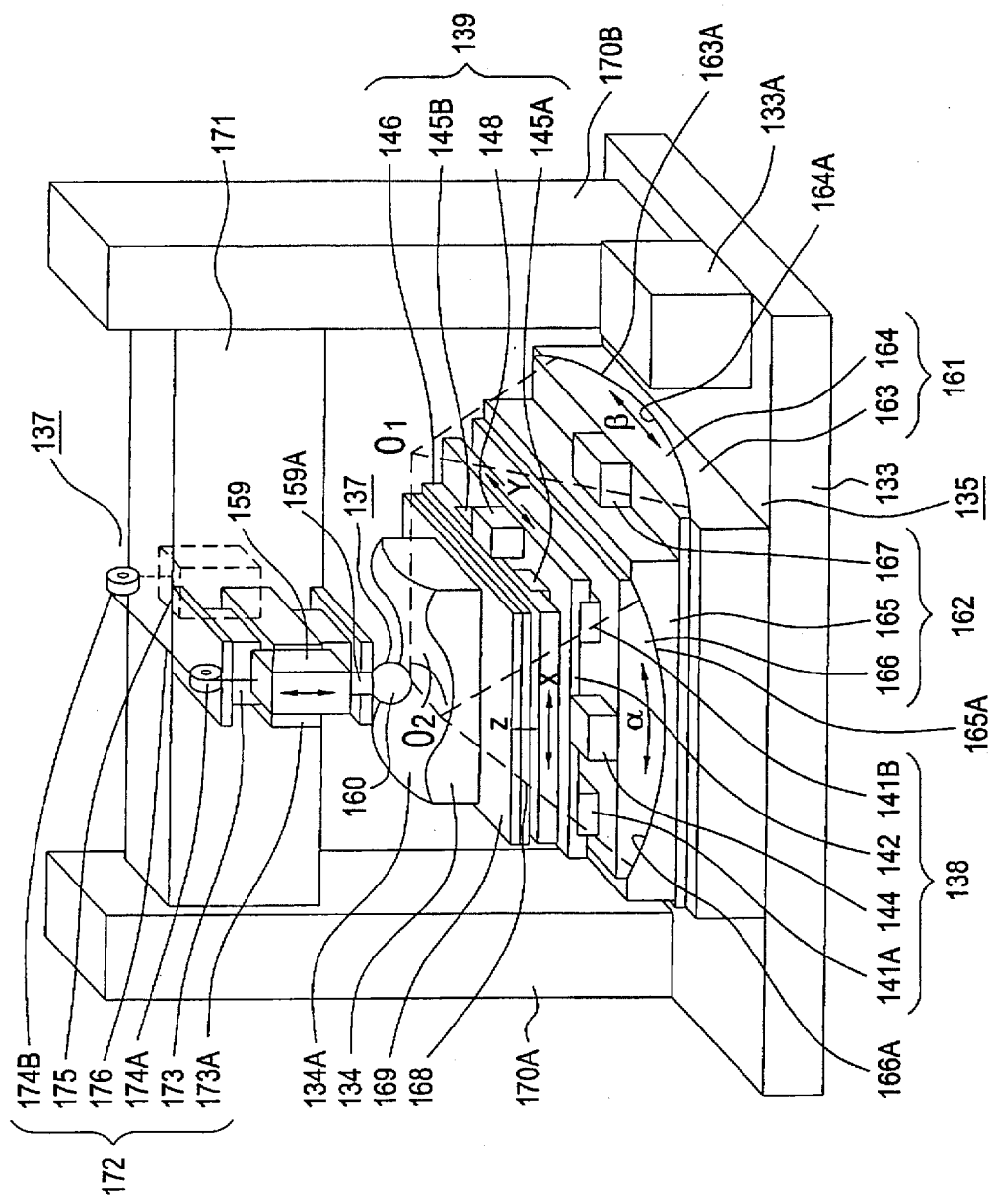
FIG. 13 is an explanatory view of the sixth embodiment of the abrading device of the present invention.
Figure 14:
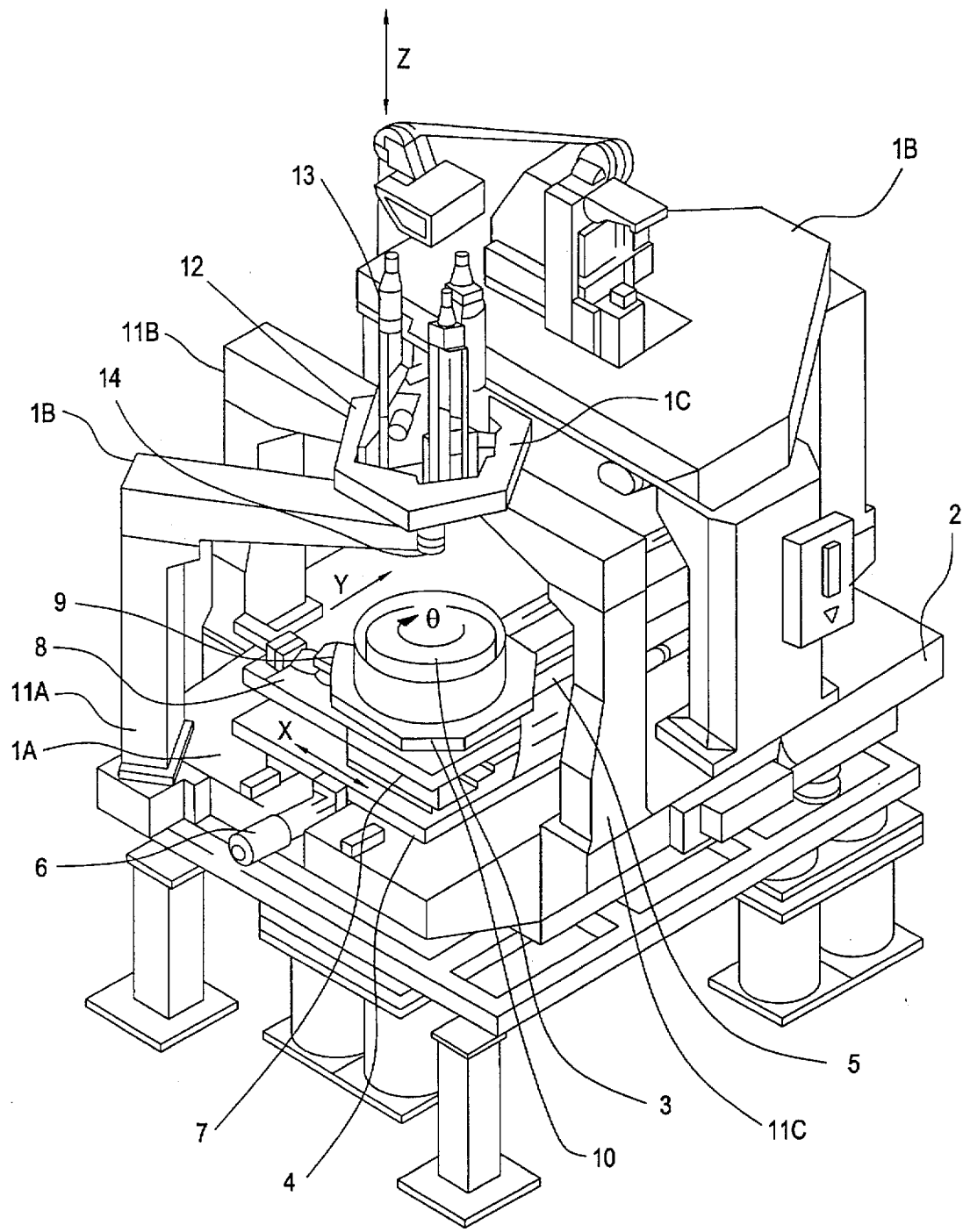
FIG. 14 is an explanatory view of the structure of the aspherical abrading device of the prior art.
Figure 15:
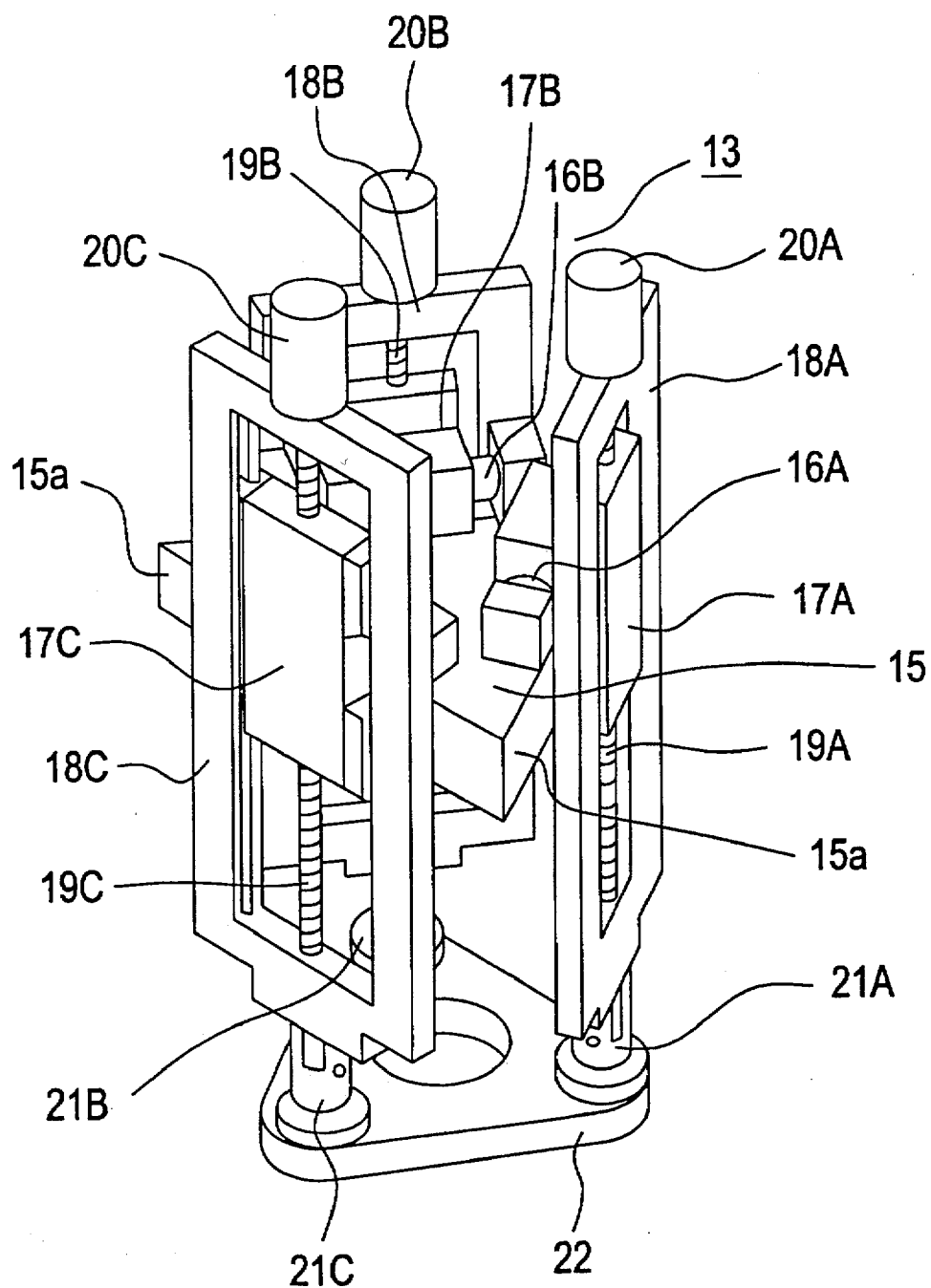
FIG. 15 is an explanatory view of the Z-tilting device of the aspherical abrading device of the prior art.
Figure 16:
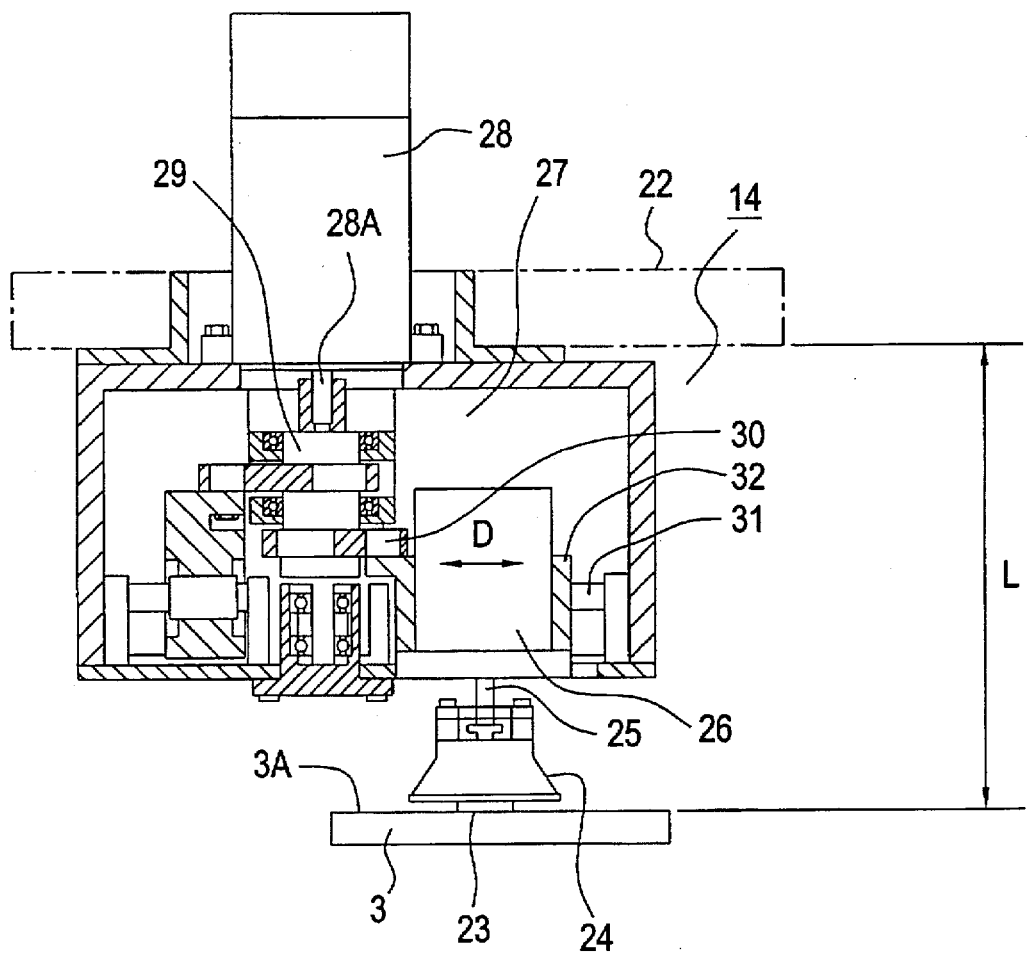
FIG. 16 is an explanatory view of the abrading head of the aspherical abrading device of the prior art.

FIG. 13 shows the sixth embodiment of the abrasive device of the present invention. In FIG. 13, since the identical items have the same reference numbers with those in FIGS. 8, 9 and 10, explanation on those items are omitted. The abrasive device for the curved surface is configured so that the table drive 135 comprises a β-direction mechanism 161 for rotatably moving the workpiece 134 in the β-direction, α-direction mechanism 162 for rotatably moving the workpiece 134 in the α-direction and the Z-axis mechanism 168 for moving the workpiece 134 in vertical direction, and the abrading head supporting mechanism 136 comprises columns 170A and 170B both mounted on the level block 133, a beam 171 expanded between those columns and a vertical moving mechanism 172 mounted on the beam 171.

The β-direction mechanism 161 comprises a circular arc guide 163 having a recessed circular arc surface 163A having a center curvature parallel to the X-axis, which is mounted on the level block 133, a β-direction table 164 having a circular convex surface 164A having a center curvature parallel to the X-axis, which is slidably adjusted to the-recessed circular arc surface 163A of the circular arc guide 163 for allowing the movement of the β-direction table 164 along to the β-direction, a ball screw (not shown) being gear-engaged with an inner nut (not shown) of the β-direction table 164 and a servo motor (not shown) having a drive shaft mechanically engaged to one end of the ball screw (not shown) for moving and adjusting the position of β-direction table in the β-direction by rotating the ball screw (not shown). The center of curvature $O_1$ of each circular arc surface 163A of the circular arc guide 163 and circular arc surface 164A of the β-direction table 164 is consistent with the tip of the abrading tip 160 in a plane defined by both Y, Z axes.

The α-direction mechanism 162 comprises a circular arc guide 165 having a recessed circular arc surface 165A having a center curvature parallel to the Y-axis, which is mounted on the β-direction table 164, an α-direction table 166 having a circular convex surface 166A having a center curvature parallel to the Y-axis, which is slidably adjusted to the recessed circular arc surface 165A of the circular arc guide 165 for allowing the movement of the α-direction table 166 along to the α-direction, a ball screw (not shown) being gear-engaged with an inner nut (not shown) of the α-direction table 166 and a servo motor 167 having a drive shaft mechanically engaged to one end of the ball screw (not shown) for moving and adjusting the position of α-direction table in the α-direction by rotating the ball screw (not shown).

The center of curvature $O_2$ of each circular arc surface 165A of the circular arc guide 165 and circular arc surface 166A of the α-direction table 166 is consistent with the tip of the abrading tip 160 in a plane defined by both X and Z axes.

The Z-axis mechanism 168 comprises a lifter (not shown) and a Z-axis table 169 that is moved in upward or downward direction of the workpiece 134 and adjusted at the certain position by the lifter.

The vertical movement mechanism 172 comprises a slide mechanism 173 having a vertically movable slider 173A fixing a spindle 159 thereon for guiding the vertical movement of the abrading head 137 and maintaining the position of the abrading head 137 constant, pulleys 174A and 174B and a wire 176 having two ends one of which is engaged to a weight block 175 and the other is engaged to the slider 173A, which extends between both pulleys. The weight of the weight block 175 is set to less weight in a certain amount than the total weight of the slider 173A, the spindle 159 and the abrading tip 160 so that the abrading tip 160 contacts the work surface 134A in a certain constant pressing force that is equal to the weight subtracting the weight of the weight block 175 from the total weight of the slider 173A, the spindle 159 and the abrading tip 160 while the weight block 175 is moved upwardly for compensating the total displacement of the moving of the abrading tip 160 and the abrading tip 160 is moved downwardly in response to the configuration of the work surface 134A, or while the weight block 175 is moved downwardly for compensating the total displacement of the moving of the abrading tip 160 and the abrading tip 160 is moved upwardly in response to the configuration of the work surface 134A.

The abrasive method using the sixth embodiment of the abrasive device is explained hereinafter.

Primarily, abrasive is applied onto the work surface 134A of the workpiece 134 and the abrading tip 160 contacts onto the work surface 134A with a slight force by adjusting a load of the weight block 175. Then, the abrading process on the work surface 134A of the workpiece 134 is performed by rotating the abrading tip 160 by actuating the motor of the spindle 159. At the same time, the drive controller 133A outputs certain control signals toward respective drivers of the servo motor 145 of the Y-axis mechanism, the servo motor 148 of the X-axis mechanism, the servo motor of the β-direction mechanism 161, the servo motor 167 of the α-direction mechanism 162 and the lifter of the Z-axis mechanism__based on data calculated in the processor and controls the horizontal positions of each Y-axis table 142 and X-axis table 146, rotated positions of each α-direction table 166 and β-direction table 164 and the vertical positions of the Z-axis table 169 so that the abrading head 137 is always directed toward a certain position against the work surface 134A. In other words, the pressing direction of the abrading tip 160 is consistent with the normal line at any contact points on the working surface 134A during the scanning of abrading tip 160 on the work surface 134A. At this time, since the abrading tip 160 moves upward or downward in response to an altitude of the work surface 134A, the abrading tip 160 performs the abrading process under a certain constant pressing force that is equal to a weight subtracting the weight of the weight block 175 from the total weight of the slider 173A, the spindle 159 and the abrading tip 160. In addition, since the workpiece 134 can tilt in any direction around the contacting point with the abrading tip 160 as a center of pivotal movement by those mechanisms, it is not necessary to compensate the horizontal or vertical position of the workpiece 134 for synchronizing the direction of the load axis of the abrading tip 160 and the normal line on the work surface 134A, the practical scanning speed of the abrading tip 160 is competed with the commanded scanning speed. Thus, the dwell time distribution of the abrading tip 160 is consistent with the commanded dwell time distribution thereof to increase the processing precision.

In this invention, the direction that the abrading tip towards the work surface of the workpiece is referred to as "the thrust direction" and the direction parallel to the work surface of the workpiece is referred to as "the lateral direction".

What is claimed is:

1. An abrasive method for abrading a curved surface of a workpiece by providing an abrading head including an abrading tip having a substantially spherical outer surface and a rotating shaft supporting the abrading tip, the abrading head being positioned to face the curved surface, the abrading head and the curved surface being vertically, laterally and pivotably movable relative to one another using a thrust moving mechanism, a lateral moving mechanism and a pivotable moving mechanism all controlled with a controller, said method comprising:

contacting the substantially spherical abrading tip to the curved surface;

rotating the abrading tip;

scanning the curved surface with the rotating tip; and controlling the abrading head, the lateral moving mechanism and the pivotable moving mechanism synchronously so that the abrading tip contacts and presses the curved surface at any point thereon with a substantially constant pressure in a direction consistent with a normal line thereat.

2. An abrading method as set forth in claim 1, wherein the scanning is performed by controlling at least one of the rotating speed of the abrading tip and the pressing force of the abrading tip to the curved surface in response to a configuration of a contacting point between the abrading tip and the curved surface.

3. An abrasive method for abrading a curved surface of a workpiece by providing an abrading head including an abrading tip having a substantially spherical outer surface and a rotating shaft supporting the abrading tip, the abrading head being positioned to face the curved surface, the abrading head and the curved surface being vertically, laterally and pivotably movable relative to one another using a thrust moving mechanism, a lateral moving mechanism and a pivotable moving mechanism all controlled with a controller, said method comprising:

performing a first abrading operation comprising:

contacting the substantially spherical abrading tip to the curved surface while maintaining an angle other than zero between the pressing direction of the abrading tip and the curved surface;

rotating the abrading tip;

scanning the curved surface with the rotating tip;

controlling the abrading head, the lateral moving mechanism and the pivotable moving mechanism synchronously so that the abrading tip contacts and presses the curved surface at any point thereon with a substantially constant pressure in a direction consistent with a normal line thereat; and performing a second abrading operation comprising:

contacting the spherical abrading tip to the curved surface perpendicularly;

rotating the abrading tip;

scanning the curved surface with the rotating tip; and controlling the abrading head, the lateral moving mechanism and the pivotable moving mechanism synchronously so that the abrading tip contacts and presses the curved surface at any point thereon with the substantially constant pressure in a direction consistent with a normal line thereat.

4. An abrasive method as set forth in claim 3, further comprising: incorporating an unnecessary portion to be scanned to the workpiece; and removing the scanned unnecessary portion from the workpiece.

5. An abrasive apparatus adapted to abrade a curved surface of a workpiece comprising:

an abrading head including an abrading tip having a substantially spherical outer surface and a rotating shaft supporting the abrading tip, the abrading head being positioned to face the curved surface;

a thrust moving mechanism for relatively moving the abrading head and the curved surface;

a lateral moving mechanism for relatively moving the abrading head and the curved surface;

a pivotable moving mechanism for relatively moving the abrading head and the curved surface pivotably around a center point; and a controller for controlling the abrading head, the lateral moving mechanism and the pivotable moving mechanism synchronously so that the abrading tip contacts and presses the curved surface at any point thereon with a substantially constant pressure in a direction consistent with a normal line thereat.

6. An abrasive apparatus as set forth in claim 5, wherein the pivotable moving mechanism comprises two rotatable moving mechanisms having axes that cross at the center point.

7. An abrasive apparatus as set forth in claim 6, wherein the center point is the farthest point from the rotating shaft on the abrading tip.

8. An abrasive apparatus as set forth in claim 6, wherein the center point is a contacting point between the abrading tip and the curved surface.

9. An abrasive apparatus as set forth in claim 5, wherein the pivotable moving mechanism supports the abrading head.

10. An abrasive apparatus as set forth in claim 1, wherein the pivotable moving mechanism supports the workpiece.

11. An abrasive apparatus as set forth in claim 5, wherein the lateral moving mechanism comprises two slidable stages having sliding axes that cross, each of the sliding axes being perpendicular to a horizontal plane.

12. An abrasive apparatus as set forth in claim 5, wherein the thrust moving mechanism comprises a combination of a piston and an air cylinder formed in the abrading head.

13. An abrading apparatus as set forth in claim 5, wherein the thrust moving mechanism comprising a slider mechanism and a weight block connected thereto.

14. An abrading apparatus as set forth in claim 5, wherein the abrading tip is substantial elastic material.

15. An abrasive apparatus as set forth in claim 5, wherein the abrading tip comprises an air-tight elastic member having an abrasive surface thereon, and the rotating shaft defines an air-communication hollow for communicating the air-tight elastic member and a fluid supplying mechanism.

16. An abrasive apparatus as set forth in claim 5, further comprises an angle adjuster supporting the abrading head for adjusting an angle of the rotating shaft against the curved surface.

17. An abrasive apparatus as set forth in claim 16, wherein the abrading tip comprises an air-tight elastic member having an abrasive surface thereon, and the rotating shaft defines an air-communication hollow for communicating the air-tight elastic member and a fluid supplying mechanism.

18. An abrasive apparatus as set forth in claim 16, wherein the pivotable moving mechanism comprises two rotatable moving mechanisms having axes that cross at the center point.

19. An abrasive apparatus as set forth in claim 16, wherein the lateral moving mechanism comprises two slidable stages having sliding axes that cross, each of the sliding axes being perpendicular to a horizontal plane.

20. An abrasive apparatus as set forth in claim 16, wherein the controller also controls at least one of the rotation of the rotating shaft and the thrust moving mechanism in response to a contacting point between the abrading tip and the curved surface.

* * * * *